United States Patent
Yang

(10) Patent No.: US 10,225,295 B2
(45) Date of Patent: Mar. 5, 2019

(54) MULTICAST PACKET FORWARDING METHOD AND DEVICE

(71) Applicant: Huawei Technologies Co., Ltd., Shenzhen (CN)

(72) Inventor: Dehua Yang, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 236 days.

(21) Appl. No.: 14/719,024

(22) Filed: May 21, 2015

(65) Prior Publication Data

US 2015/0256576 A1 Sep. 10, 2015

Related U.S. Application Data

(63) Continuation of application No. PCT/CN2013/073933, filed on Apr. 9, 2013.

(30) Foreign Application Priority Data

Nov. 21, 2012 (CN) .......................... 2012 1 0474056

(51) Int. Cl.
*H04L 29/06* (2006.01)
*H04L 12/18* (2006.01)
*H04L 12/749* (2013.01)

(52) U.S. Cl.
CPC ........ *H04L 65/4076* (2013.01); *H04L 12/184* (2013.01); *H04L 45/741* (2013.01); *H04L 69/167* (2013.01); *H04L 12/1836* (2013.01)

(58) Field of Classification Search
CPC . H04L 12/184; H04L 69/167; H04L 65/4076; H04L 45/741
See application file for complete search history.

(56) References Cited

U.S. PATENT DOCUMENTS

2004/0013130 A1* 1/2004 Blanchet ................. H04L 69/16
370/466
2006/0104226 A1* 5/2006 Ahn ................... H04L 29/12066
370/315

(Continued)

FOREIGN PATENT DOCUMENTS

CN 1992667 A 7/2007
CN 101938531 A 1/2011

(Continued)

OTHER PUBLICATIONS

Templin Dynamic Host Configuration Protocol (DHCPv4) Option for the Intra-Site Automatic Tunnel Addressing Protocol (ISATAP); draft-templin-isatap-dhcp-06.txt: Dec. 8, 2009.*

(Continued)

*Primary Examiner* — Yemane Mesfin
*Assistant Examiner* — Henry Baron
(74) *Attorney, Agent, or Firm* — Conley Rose, P.C.

(57) ABSTRACT

A multicast packet forwarding method, to implement multicast forwarding of an IPv6 multicast data packet on an IPv4 network, thereby saving bandwidth of the IPv4 network. The method includes: receiving an MLD multicast group join packet that is sent by an ISATAP host, encapsulated in an IPv4 unicast packet, and used for joining an IPv6 multicast group; maintaining an IPv6 multicast forwarding table according to the MLD multicast group join packet; receiving an IPv6 multicast data packet that is sent by an IPv6 network device and corresponds to the IPv6 multicast group; encapsulating, according to an IPv6-IPv4 multicast group mapping relationship, the IPv6 multicast data packet in an IPv4 multicast data packet, and sending the IPv4 multicast data packet to an IPv4 device, so that the IPv4 device forwards the IPv4 multicast data packet to the ISATAP host.

14 Claims, 15 Drawing Sheets

(56) References Cited

U.S. PATENT DOCUMENTS

| | | | | |
|---|---|---|---|---|
| 2007/0147421 A1* | 6/2007 | Kim | ............... | H04L 12/66 370/466 |
| 2009/0016253 A1* | 1/2009 | Lewis | ............... | H04L 12/1836 370/312 |
| 2011/0286470 A1* | 11/2011 | Dec | ............... | H04L 12/1836 370/467 |
| 2012/0218910 A1 | 8/2012 | Behcet | | |

FOREIGN PATENT DOCUMENTS

| | | |
|---|---|---|
| CN | 102025522 A | 4/2011 |
| CN | 102572007 A | 7/2012 |

OTHER PUBLICATIONS

Carpenter, et al., "Transmission of IPv6 over IPv4 Domains without Explicit Tunnels," RFC 2529, Mar. 1999, 9 pages.

Templin, et al., "Intra-Site Automatic Tunnel Addressing Protocol (ISATAP)," RCE 4214, Oct. 2005, 14 pages.

Foreign Communication From a Counterpart Application, PCT Application No. PCT/CN2013/073933, English Translation of International Search Report, dated Aug. 29, 2013, 3 pages.

Foreign Communication From a Counterpart Application, PCT Application No. PCT/CN2013/073933, English Translation of Written Opinion, dated Aug. 29, 2013, 8 pages.

Templin, F., et al., "Internet/Site Automatic Tunnel Addressing Protocol (ISATAP)," draft-ietf-ngtrans-isatap-18.txt, Feb. 4, 2004, 32 pages.

Foreign Communication From A Counterpart Application, European Application No. 13856800.1, Extended European Search Report dated Oct. 20, 2015, 8 pages.

\* cited by examiner

MULTICAST PACKET FORWARDING METHOD AND DEVICE

CROSS-REFERENCE TO RELATED APPLICATIONS

This application is a continuation of International Application No. PCT/CN2013/073933, filed on Apr. 9, 2013, which claims priority to Chinese Patent Application No. 201210474056.1, filed on Nov. 21, 2012, both of which are hereby incorporated by reference in their entireties.

TECHNICAL FIELD

The present invention relates to the communications field, and more specifically, to a multicast packet forwarding method, an Intra-Site Automatic Tunnel Addressing Protocol (ISATAP) device, an ISATAP host, and an Internet Protocol version 4 (IPv4) device.

BACKGROUND

An Internet Protocol version 6 (IPv6) over IPv4 (IPv6 over IPv4) technology is that: an IPv6 packet is encapsulated in an IPv4 packet, to implement transparent transmission of the IPv6 packet on an IPv4 network. During an initial phase of transition from an IPv4 network to an IPv6 network, IPv4 networks have been widely deployed and IPv6 networks are isolated islands dispersed around the world. It is apparently uneconomical to connect these isolated islands by using dedicated lines, and a common approach is to use a tunnel technology. The tunnel technology may be used to create tunnels on the IPv4 networks, so as to implement interconnection of the isolated IPv6 islands. This is similar to a situation in which a tunnel technology is used on an Internet Protocol (IP) network to deploy a virtual private network (VPN). An ISATAP tunnel is used in a situation in which an IPv4/IPv6 host on an IPv4 network accesses an IPv6 network, and the ISATAP tunnel may be established between the IPv4/IPv6 host and an ISATAP device. For ease of description, the IPv4/IPv6 host is uniformly referred to as an ISATAP host in the following content.

An ISATAP tunnel on a device generally serves multiple ISATAP hosts. When multiple ISATAP hosts need to order an IPv6 multicast group program on an IPv6 network, an ISATAP device needs to enable a Multicast Listener Discovery protocol (MLD) function. An ISATAP host encapsulates an MLD multicast group member join packet in an IPv4 unicast packet, and sends the IPv4 unicast packet to the ISATAP device. Because each IPv6 multicast group in MLD multicast group join information saves local link address information only of an ISATAP host that last sends an MLD multicast group member join packet, after the ISATAP device receives an IPv6 multicast data packet, the ISATAP device can only copy the IPv6 multicast data packet and encapsulate copies in IPv4 unicast packets, and the IPv4 unicast packets are forwarded to all ISATAP hosts by a device on an IPv4 network. As a result, some ISATAP hosts that do not order this IPv6 multicast group may also receive IPv6 multicast data. In addition, the IPv6 multicast data is first copied and then is encapsulated in the IPv4 unicast packets for transmission, which results in waste of bandwidth of the IPv4 network.

SUMMARY

Embodiments of the present invention provide a multicast packet forwarding method, an ISATAP device, an ISATAP host, and an IPv4 device, which can save bandwidth of an IPv4 network.

According to a first aspect, a multicast packet forwarding method is provided, including: receiving a MLD multicast group join packet that is sent by an ISATAP host, encapsulated in an IPv4 unicast packet, and used for joining an IPv6 multicast group; maintaining an IPv6 multicast forwarding table according to the MLD multicast group join packet; receiving an IPv6 multicast data packet that is sent by an IPv6 network device and corresponds to the IPv6 multicast group; determining, according to the IPv6 multicast forwarding table, that an outbound interface of the IPv6 multicast group is an ISATAP tunnel interface; and acquiring an IPv6-IPv4 multicast group mapping relationship, acquiring, according to the multicast group mapping relationship, an IPv4 multicast group corresponding to the IPv6 multicast group, encapsulating the IPv6 multicast data packet in an IPv4 multicast data packet corresponding to the IPv4 multicast group, and sending the IPv4 multicast data packet to an IPv4 device, so that the IPv4 device forwards the IPv4 multicast data packet to the ISATAP host.

In a first possible implementation manner, before the acquiring an IPv6-IPv4 multicast group mapping relationship, the method further includes: establishing the multicast group mapping relationship.

With reference to the first aspect or the first possible implementation manner of the first aspect, in a second possible implementation manner, the method further includes: sending an MLD general group query packet or an MLD group-specific query packet that is encapsulated in an IPv4 unicast packet, to the ISATAP host; and the receiving a MLD multicast group join packet that is sent by an ISATAP host, encapsulated in an IPv4 unicast packet, and used for joining an IPv6 multicast group includes: receiving the MLD multicast group join packet that is sent by the ISATAP host when the ISATAP host responds to the MLD general group query packet or the MLD group-specific query packet.

With reference to the first aspect or the first or second possible implementation manner of the first aspect, in a third possible implementation manner, the method further includes: receiving an MLD multicast group leave packet that is sent by the ISATAP host, encapsulated in an IPv4 unicast packet, and used for leaving the IPv6 multicast group; and maintaining the IPv6 multicast forwarding table according to the MLD multicast group leave packet.

According to a second aspect, a multicast packet forwarding method is provided, including: sending a MLD multicast group join packet that is encapsulated in an IPv4 unicast packet and used for joining an IPv6 multicast group, to an ISATAP device, so that the ISATAP device maintains an IPv6 multicast forwarding table according to the MLD multicast group join packet; acquiring an IPv6-IPv4 multicast group mapping relationship, and generating, according to the multicast group mapping relationship, an Internet Group Management Protocol (IGMP) multicast group join packet used for joining an IPv4 multicast group; sending the IGMP multicast group join packet to an IPv4 device, so that the IPv4 device maintains an IPv4 multicast forwarding table according to the IGMP multicast group join packet; receiving an IPv4 multicast data packet that is sent by the ISATAP device and forwarded based on the IPv4 multicast forwarding table by the IPv4 device, where the IPv4 multicast data packet is generated by the ISATAP device by encapsulating, according to the multicast group mapping relationship, an IPv6 multicast data packet corresponding to the IPv6 multicast group in a multicast packet corresponding to the IPv4 multicast group when the ISATAP device determines, according to the IPv6 multicast forwarding table, that an outbound interface of the IPv6 multicast group is an ISATAP tunnel interface; and decapsulating the IPv4 multicast data packet to acquire the IPv6 multicast data packet.

In a first possible implementation manner, before the acquiring an IPv6-IPv4 multicast group mapping relationship, the method further includes: establishing the multicast group mapping relationship.

With reference to the second aspect or the first possible implementation manner of the second aspect, in a second possible implementation manner, the method further includes: receiving an MLD general group query packet or an MLD group-specific query packet that is sent by the ISATAP device and encapsulated in an IPv4 unicast packet; determining, according to the IPv6 multicast group that is joined, to respond to the MLD general group query packet or the MLD group-specific query packet; and sending the MLD multicast group join packet to the ISATAP device when responding to the MLD general group query packet or the MLD group-specific query packet, so that the ISATAP device maintains the IPv6 multicast forwarding table according to the MLD multicast group join packet.

With reference to the second aspect or the first or second possible implementation manner of the second aspect, in a third possible implementation manner, the method further includes: receiving an IGMP general group query packet or an IGMP group-specific query packet sent by the IPv4 device; determining, according to the IPv6 multicast group that is joined and the multicast group mapping relationship, to respond to the IGMP general group query packet or the IGMP group-specific query packet; and sending the IGMP multicast group join packet to the IPv4 device when responding to the IGMP general group query packet or the IGMP group-specific query packet, so that the IPv4 device maintains the IPv4 multicast forwarding table according to the IGMP multicast group join packet.

With reference to the second aspect or the first possible implementation manner of the second aspect, in a fourth possible implementation manner, the method further includes: receiving an IGMP general group query packet or an IGMP group-specific query packet sent by the IPv4 device; determining, according to the IPv6 multicast group that is joined and the multicast group mapping relationship, to convert the IGMP general group query packet or the IGMP group-specific query packet into an MLD general group query packet or an MLD group-specific query packet; determining, according to the IPv6 multicast group that is joined, to respond to the MLD general group query packet or the MLD group-specific query packet; and sending the IGMP multicast group join packet to the IPv4 device when responding to the MLD general group query packet or the MLD group-specific query packet, so that the IPv4 device maintains the IPv4 multicast forwarding table according to the IGMP multicast group join packet.

With reference to the second aspect or any possible implementation manner of the first to fourth possible implementation manners of the second aspect, in a fifth possible implementation manner, the method further includes: sending an MLD multicast group leave packet that is encapsulated in an IPv4 unicast packet and used for leaving the IPv6 multicast group, to the ISATAP device, so that the ISATAP device maintains the IPv6 multicast forwarding table according to the MLD multicast group leave packet.

With reference to the second aspect or any possible implementation manner of the first to fifth possible implementation manners of the second aspect, in a sixth possible implementation manner, the method further includes: generating, according to the multicast group mapping relationship, an IGMP multicast group leave packet used for leaving the IPv4 multicast group; and sending the IGMP multicast group leave packet to the IPv4 device, so that the IPv4 device maintains the IPv4 multicast forwarding table according to the IGMP multicast group leave packet.

According to a third aspect, a multicast packet forwarding method is provided, including: receiving an IGMP multicast group join packet that is sent by an ISATAP host and used for joining an IPv4 multicast group, where the IGMP multicast group join packet is generated by the ISATAP host according to an IPv6-IPv4 multicast group mapping relationship and an IPv6 multicast group that is joined; maintaining an IPv4 multicast forwarding table according to the IGMP multicast group join packet; receiving an IPv4 multicast data packet sent by an ISATAP device, where the IPv4 multicast data packet is generated by the ISATAP device by encapsulating, according to the multicast group mapping relationship, an IPv6 multicast data packet corresponding to the IPv6 multicast group in a multicast packet corresponding to the IPv4 multicast group; and forwarding, based on the IPv4 multicast forwarding table, the IPv4 multicast data packet to the ISATAP host.

In a first possible implementation manner, the method further includes: sending an IGMP general group query packet or an IGMP group-specific query packet to the ISATAP host; and the receiving an IGMP multicast group join packet that is sent by an ISATAP host and used for joining an IPv4 multicast group includes: receiving the IGMP multicast group join packet that is sent by the ISATAP host when the ISATAP host responds to the IGMP general group query packet or the IGMP group-specific query packet.

With reference to the third aspect or the first possible implementation manner of the third aspect, in a second possible implementation manner, the method further includes: receiving an IGMP multicast group leave packet that is sent by the ISATAP host and used for leaving the IPv4 multicast group; and maintaining the IPv4 multicast forwarding table according to the IGMP multicast group leave packet.

According to a fourth aspect, an ISATAP device is provided, including: a receiving module configured to receive a MLD multicast group join packet that is sent by an ISATAP host, encapsulated in an IPv4 unicast packet, and used for joining an IPv6 multicast group; a processing module configured to maintain an IPv6 multicast forwarding table according to the MLD multicast group join packet, where the receiving module is further configured to receive an IPv6 multicast data packet that is sent by an IPv6 network device and corresponds to the IPv6 multicast group; and the processing module is further configured to determine, according to the IPv6 multicast forwarding table, that an outbound interface of the IPv6 multicast group is an ISATAP tunnel interface, acquire an IPv6-IPv4 multicast group mapping relationship, acquire, according to the multicast group mapping relationship, an IPv4 multicast group corresponding to the IPv6 multicast group, and encapsulate the IPv6 multicast data packet in an IPv4 multicast data packet corresponding to the IPv4 multicast group; and a sending module configured to send the IPv4 multicast data packet to an IPv4 device, so that the IPv4 device forwards the IPv4 multicast data packet to the ISATAP host.

In a first possible implementation manner, the ISATAP device further includes: an establishing module configured to: before the processing module acquires the IPv6-IPv4 multicast group mapping relationship, establish the multicast group mapping relationship.

With reference to the fourth aspect or the first possible implementation manner of the fourth aspect, in a second possible implementation manner, the sending module is further configured to send an MLD general group query packet or an MLD group-specific query packet that is encapsulated in an IPv4 unicast packet, to the ISATAP host; and the receiving module is further configured to receive the MLD multicast group join packet that is sent by the ISATAP host when the ISATAP host responds to the MLD general group query packet or the MLD group-specific query packet.

With reference to the fourth aspect or the first or second possible implementation manner of the fourth aspect, in a third possible implementation manner, the receiving module is further configured to receive an MLD multicast group leave packet that is sent by the ISATAP host, encapsulated in an IPv4 unicast packet, and used for leaving the IPv6 multicast group; and the processing module is further configured to maintain the IPv6 multicast forwarding table according to the MLD multicast group leave packet.

According to a fifth aspect, an ISATAP host is provided, including: a sending module configured to send a MLD multicast group join packet that is encapsulated in an IPv4 unicast packet and used for joining an IPv6 multicast group, to an ISATAP device, so that the ISATAP device maintains an IPv6 multicast forwarding table according to the MLD multicast group join packet; a processing module configured to acquire an IPv6-IPv4 multicast group mapping relationship, and generate, according to the multicast group mapping relationship, an IGMP multicast group join packet used for joining an IPv4 multicast group, where the sending module is further configured to send the IGMP multicast group join packet to an IPv4 device, so that the IPv4 device maintains an IPv4 multicast forwarding table according to the IGMP multicast group join packet; and a receiving module configured to receive an IPv4 multicast data packet that is sent by the ISATAP device and forwarded based on the IPv4 multicast forwarding table by the IPv4 device, where the IPv4 multicast data packet is generated by the ISATAP device by encapsulating, according to the multicast group mapping relationship, an IPv6 multicast data packet corresponding to the IPv6 multicast group in a multicast packet corresponding to the IPv4 multicast group when the ISATAP device determines, according to the IPv6 multicast forwarding table, that an outbound interface of the IPv6 multicast group is an ISATAP tunnel interface, where the processing module is further configured to decapsulate the IPv4 multicast data packet to acquire the IPv6 multicast data packet.

In a first possible implementation manner, the ISATAP host further includes: an establishing module configured to: before the processing module acquires the IPv6-IPv4 multicast group mapping relationship, establish the multicast group mapping relationship.

With reference to the fifth aspect or the first possible implementation manner of the fifth aspect, in a second possible implementation manner, the receiving module is further configured to receive an MLD general group query packet or an MLD group-specific query packet that is sent by the ISATAP device and encapsulated in an IPv4 unicast packet; the processing module is further configured to determine, according to the IPv6 multicast group that is joined, to respond to the MLD general group query packet or the MLD group-specific query packet; and the sending module is further configured to send the MLD multicast group join packet to the ISATAP device when responding to the MLD general group query packet or the MLD group-specific query packet, so that the ISATAP device maintains the IPv6 multicast forwarding table according to the MLD multicast group join packet.

With reference to the fifth aspect or the first or second possible implementation manner of the fifth aspect, in a third possible implementation manner, the receiving module is further configured to receive an IGMP general group query packet or an IGMP group-specific query packet sent by the IPv4 device; the processing module is further configured to determine, according to the IPv6 multicast group that is joined and the multicast group mapping relationship, to respond to the IGMP general group query packet or the IGMP group-specific query packet; and the sending module is further configured to send the IGMP multicast group join packet to the IPv4 device when responding to the IGMP general group query packet or the IGMP group-specific query packet, so that the IPv4 device maintains the IPv4 multicast forwarding table according to the IGMP multicast group join packet.

With reference to the fifth aspect or the first possible implementation manner of the fifth aspect, in a fourth possible implementation manner, the receiving module is further configured to receive an IGMP general group query packet or an IGMP group-specific query packet sent by the IPv4 device; the processing module is further configured to determine, according to the IPv6 multicast group that is joined and the multicast group mapping relationship, to convert the IGMP general group query packet or the IGMP group-specific query packet into an MLD general group query packet or an MLD group-specific query packet, and determine, according to the IPv6 multicast group that is joined, to respond to the MLD general group query packet or the MLD group-specific query packet; and the sending module is further configured to send the IGMP multicast group join packet to the IPv4 device when responding to the MLD general group query packet or the MLD group-specific query packet, so that the IPv4 device maintains the IPv4 multicast forwarding table according to the IGMP multicast group join packet.

With reference to the fifth aspect or any possible implementation manner of the first to fourth possible implementation manners of the fifth aspect, in a fifth possible implementation manner, the sending module is further configured to send an MLD multicast group leave packet that is encapsulated in an IPv4 unicast packet and used for leaving the IPv6 multicast group, to the ISATAP device, so that the ISATAP device maintains the IPv6 multicast forwarding table according to the MLD multicast group leave packet.

With reference to the fifth aspect or any possible implementation manner of the first to fifth possible implementation manners of the fifth aspect, in a sixth possible implementation manner, the processing module is further configured to generate, according to the multicast group mapping relationship, an IGMP multicast group leave packet used for leaving the IPv4 multicast group; and the sending module is further configured to send the IGMP multicast group leave packet to the IPv4 device, so that the IPv4 device maintains the IPv4 multicast forwarding table according to the IGMP multicast group leave packet.

According to a sixth aspect, an IPv4 device is provided, including: a receiving module configured to receive an IGMP multicast group join packet that is sent by an ISATAP host and used for joining an IPv4 multicast group, where the IGMP multicast group join packet is generated by the ISATAP host according to an IPv6-IPv4 multicast group mapping relationship and an IPv6 multicast group that is joined; a processing module configured to maintain an IPv4 multicast forwarding table according to the IGMP multicast group join packet, where the receiving module is further configured to receive an IPv4 multicast data packet sent by an ISATAP device, where the IPv4 multicast data packet is generated by the ISATAP device by encapsulating, according to the multicast group mapping relationship, an IPv6 multicast data packet corresponding to the IPv6 multicast group in a multicast packet corresponding to the IPv4 multicast group; and a sending module configured to forward, based on the IPv4 multicast forwarding table, the IPv4 multicast data packet to the ISATAP host.

In a first possible implementation manner, the sending module is further configured to send an IGMP general group query packet or an IGMP group-specific query packet to the ISATAP host; and the receiving module is further configured to receive the IGMP multicast group join packet that is sent by the ISATAP host when the ISATAP host responds to the IGMP general group query packet or the IGMP group-specific query packet.

With reference to the sixth aspect or the first possible implementation manner of the sixth aspect, in a second possible implementation manner, the receiving module is further configured to receive an IGMP multicast group leave packet that is sent by the ISATAP host and used for leaving the IPv4 multicast group; and the processing module is further configured to maintain the IPv4 multicast forwarding table according to the IGMP multicast group leave packet.

Based on the foregoing technical solution, in the embodiments of the present invention, an IPv6 multicast data packet is encapsulated, according to an IPv6-IPv4 multicast group mapping relationship, in an IPv4 multicast data packet corresponding to an IPv4 multicast group, and the IPv4 multicast data packet is then sent to an IPv4 network; therefore, multicast forwarding of the IPv6 multicast data packet on the IPv4 network may be implemented without a need to copy the IPv6 multicast data packet and transmit multiple copies on the IPv4 network, thereby saving bandwidth of the IPv4 network.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
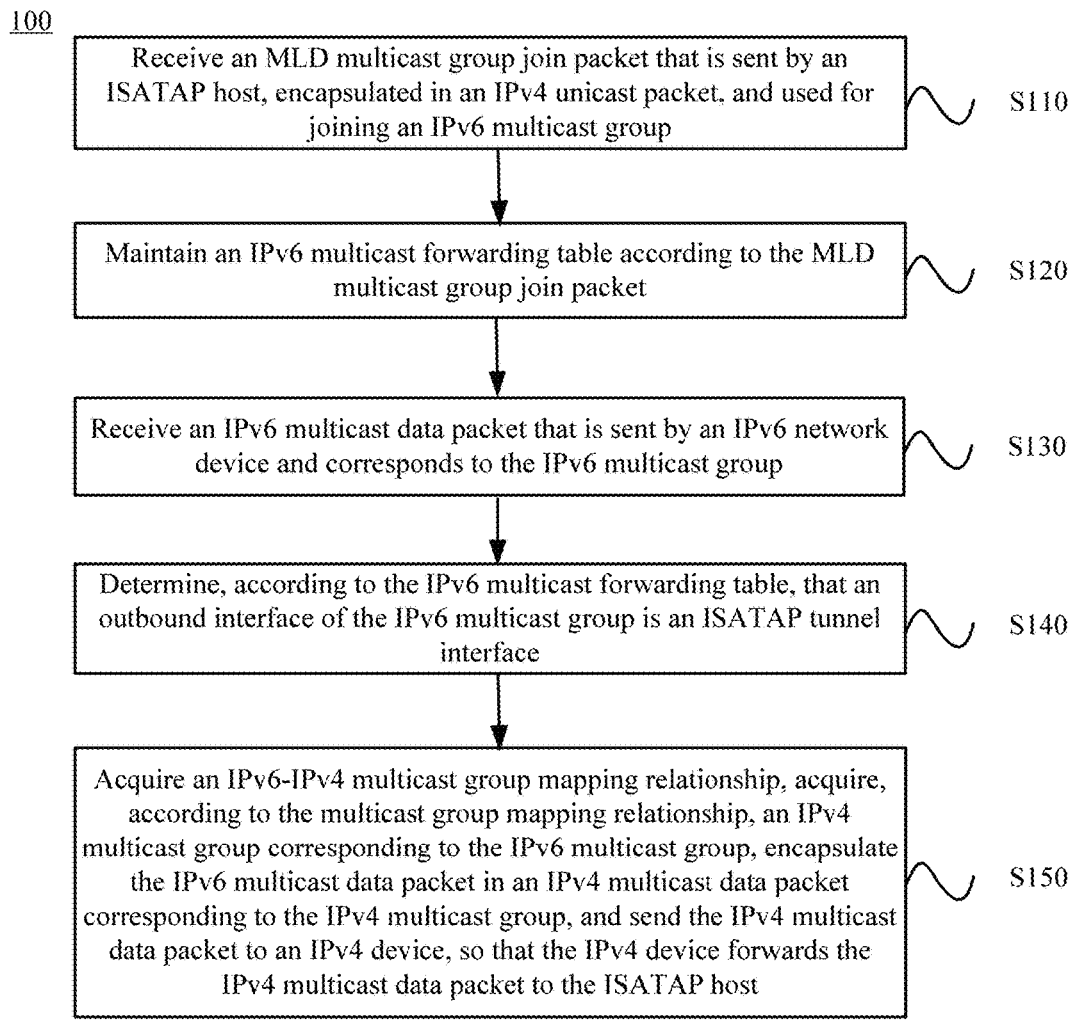
FIG. 1 is a schematic flowchart of a multicast packet forwarding method according to an embodiment of the present invention.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

In the embodiments of the present invention, an ISATAP device is also referred to as an ISATAP tunnel device, and it can encapsulate an IPv6 packet in an IPv4 packet, and send the IPv4 packet to an ISATAP host; the ISATAP host is also referred to as an IPv4/IPv6 host, and it can encapsulate an IPv6 packet in an IPv4 packet, and send the IPv4 packet to the ISATAP device. An ISATAP tunnel is established between the ISATAP host and the ISATAP device. The ISATAP tunnel is used in a situation in which an IPv4/IPv6 host on an IPv4 network accesses an IPv6 network. When the ISATAP tunnel is established, an address in an ISATAP format needs to be used, and the format thereof is as follows: Prefix(64 bit)::5EFE:IPv4-Address. A process in which the ISATAP host obtains an IPv6 address is as follows:

1. The ISATAP host sends a request message to the ISATAP device: The IPv4/IPv6 host sends an ISATAP device request message to the ISATAP device by using a local link address in the ISATAP format, where the ISATAP device request message is encapsulated in an IPv4 packet.

2. The ISATAP device responds to the request: The ISATAP device responds to the request of the ISATAP host by using a notification message, where the notification message includes an ISATAP prefix (the ISATAP prefix is manually configured on the ISATAP device).

3. The ISATAP host obtains its IPv6 address: The ISATAP host obtains its IPv6 address by combining the ISATAP prefix with 5EFE:IPv4-Address, and uses this IPv6 address to access an IPv6 host.

An operating principle of access to the IPv6 network in a unicast manner by the ISATAP host is as follows:

1. The ISATAP host on the IPv4 network obtains its IPv6 address according to the foregoing process.

2. The ISATAP host sends a packet for accessing an IPv6 host on the IPv6 network, where the packet is encapsulated in an IPv4 packet.

3. The ISATAP device executes a decapsulation operation after receiving the IPv4 packet, and sends an IPv6 packet therein to the IPv6 host on the IPv6 network.

4. When the IPv6 host on the IPv6 network sends an IPv6 packet to the ISATAP host, the IPv6 packet is sent by a device on the IPv6 network to the ISATAP device; the ISATAP device resolves a destination IPv4 address according to a destination IPv6 address in the packet; the ISATAP device encapsulates the IPv6 packet in an IPv4 packet, and the packet is forwarded by a device on the IPv4 network to the ISATAP host; the ISATAP host executes decapsulation, and sends the IPv6 packet upstream to an IPv6 protocol layer of the ISATAP host for processing.

FIG. 1 shows a schematic flowchart of a multicast packet forwarding method 100 according to an embodiment of the present invention. The method 100 is executed by an ISATAP device. As shown in FIG. 1, the method 100 includes:

S110: Receive an MLD multicast group join packet that is sent by an ISATAP host, encapsulated in an IPv4 unicast packet, and used for joining an IPv6 multicast group.

S120: Maintain an IPv6 multicast forwarding table according to the MLD multicast group join packet.

S130: Receive an IPv6 multicast data packet that is sent by an IPv6 network device and corresponds to the IPv6 multicast group.

S140: Determine, according to the IPv6 multicast forwarding table, that an outbound interface of the IPv6 multicast group is an ISATAP tunnel interface.

S150: Acquire an IPv6-IPv4 multicast group mapping relationship, acquire, according to the multicast group mapping relationship, an IPv4 multicast group corresponding to the IPv6 multicast group, encapsulate the IPv6 multicast data packet in an IPv4 multicast data packet corresponding to the IPv4 multicast group, and send the IPv4 multicast data packet to an IPv4 device, so that the IPv4 device forwards the IPv4 multicast data packet to the ISATAP host.

When requesting the IPv6 multicast data packet, the ISATAP host sends an MLD multicast group join packet used for joining an IPv6 multicast group to the ISATAP device, where the MLD multicast group join packet is encapsulated in the IPv4 unicast packet, and the IPv4 unicast packet is forwarded by a device on an IPv4 network to the ISATAP device. In addition, the ISATAP host constructs, according to the IPv6-IPv4 multicast group mapping relationship, an IPv4 multicast group join packet in a format of the IGMP, and sends the IPv4 multicast group join packet to an IPv4 device on a broadcast network in which the ISATAP host is located. After receiving the MLD multicast group join packet that is sent by the ISATAP host, encapsulated in the IPv4 unicast packet, and used for joining the IPv6 multicast group, the ISATAP device decapsulates the packet, generates an IPv6 multicast group member information table according to the MLD multicast group join packet, and maintains the IPv6 multicast forwarding table. When receiving the IPv6 multicast data packet that is sent by the IPv6 network device and corresponds to the IPv6 multicast group, the ISATAP device determines the outbound interface of the IPv6 multicast group according to the IPv6 multicast forwarding table. When determining that the outbound interface of the IPv6 multicast group is the ISATAP tunnel interface, the ISATAP device acquires the IPv6-IPv4 multicast group mapping relationship, acquires, according to the multicast group mapping relationship, the IPv4 multicast group corresponding to the IPv6 multicast group, encapsulates the IPv6 multicast data packet in the IPv4 multicast data packet corresponding to the IPv4 multicast group, and sends the IPv4 multicast data packet to the IPv4 device, and the IPv4 device forwards the IPv4 multicast data packet to the ISATAP host. Because the ISATAP device encapsulates the IPv6 multicast data packet in the IPv4 multicast data packet and sends the IPv4 multicast data packet to the IPv4 network, it is unnecessary to copy IPv6 multicast data and transmit multiple copies on the IPv4 network.

Therefore, according to the multicast packet forwarding method in this embodiment of the present invention, an IPv6 multicast data packet is encapsulated, according to an IPv6-IPv4 multicast group mapping relationship, in an IPv4 multicast data packet corresponding to an IPv4 multicast group, and the IPv4 multicast data packet is then sent to an IPv4 network; therefore, multicast forwarding of the IPv6 multicast data packet on the IPv4 network may be implemented without a need to copy IPv6 multicast data and transmit multiple copies on the IPv4 network, thereby saving bandwidth of the IPv4 network.

In S110, the ISATAP device receives the MLD multicast group join packet that is sent by the ISATAP host, encapsulated in the IPv4 unicast packet, and used for joining the IPv6 multicast group.

When requesting to join the IPv6 multicast group, the ISATAP host encapsulates the MLD multicast group join packet in the IPv4 unicast packet, and sends the IPv4 unicast packet to the ISATAP device. A destination IPv4 address of the IPv4 unicast packet is a destination address of the ISATAP device, which is configured on the ISATAP host. The unicast packet is forwarded by the device on the IPv4 network to the ISATAP device. In this way, the ISATAP device receives the MLD multicast group join packet that is sent by the ISATAP host, encapsulated in the IPv4 unicast packet, and forwarded by the device on the IPv4 network.

In S120, the ISATAP device maintains the IPv6 multicast forwarding table according to the MLD multicast group join packet.

After receiving the MLD multicast group join packet encapsulated in the IPv4 unicast packet, the ISATAP device decapsulates the IPv4 unicast packet to obtain the MLD multicast group join packet, sends the MLD multicast group join packet upstream to an MLD protocol layer for processing, generates an IPv6 multicast group member information table, sends an IPv6 Protocol Independent Multicast (PIM) message upstream, and maintains the IPv6 multicast forwarding table (which is also referred to as a multicast routing table). For example, an entry of the ISATAP host is added to the IPv6 multicast forwarding table, where an outbound interface corresponding to the ISATAP host is an ISATAP tunnel interface.

In S130, the ISATAP device receives the IPv6 multicast data packet that is sent by the IPv6 network device and corresponds to the IPv6 multicast group.

When there is the IPv6 multicast data packet of the IPv6 multicast group on an IPv6 network, the IPv6 network device forwards the IPv6 multicast data packet to the ISATAP device.

In S140, the ISATAP device determines, according to the IPv6 multicast forwarding table, that the outbound interface of the IPv6 multicast group is the ISATAP tunnel interface.

After receiving the IPv6 multicast data packet that is sent by the IPv6 network device and corresponds to the IPv6 multicast group, the ISATAP device determines the outbound interface of the IPv6 multicast group according to the IPv6 multicast forwarding table. Because the IPv6 multicast group is a multicast group joined by the ISATAP host, there is an ISATAP tunnel interface in the outbound interface of the IPv6 multicast group.

In S150, when determining that the outbound interface of the IPv6 multicast group is the ISATAP tunnel interface, the ISATAP device acquires the IPv6-IPv4 multicast group mapping relationship, acquires, according to the multicast group mapping relationship, the IPv4 multicast group corresponding to the IPv6 multicast group, encapsulates the IPv6 multicast data packet in the IPv4 multicast data packet corresponding to the IPv4 multicast group, and sends the IPv4 multicast data packet to the IPv4 device, so that the IPv4 device forwards the IPv4 multicast data packet to the ISATAP host.

When it is determined that the outbound interface of the IPv6 multicast group is the ISATAP tunnel interface, that is, when it is required to send IPv6 multicast data to the IPv4 network through an ISATAP tunnel, the ISATAP device acquires the IPv6-IPv4 multicast group mapping relationship, acquires, according to the multicast group mapping relationship, the IPv4 multicast group corresponding to the IPv6 multicast group, and encapsulates the IPv6 multicast data packet in the IPv4 multicast data packet corresponding to the IPv4 multicast group, where a source IPv4 address of the IPv4 multicast data packet is a source IPv4 address of an outbound interface of the ISATAP tunnel. Then, the ISATAP device sends an encapsulated IPv4 multicast data packet to the IPv4 device on the IPv4 network. Then, the IPv4 device forwards the IPv4 multicast data packet to an ISATAP host in the IPv4 multicast group according to its IPv4 multicast forwarding table.

Figure 2:
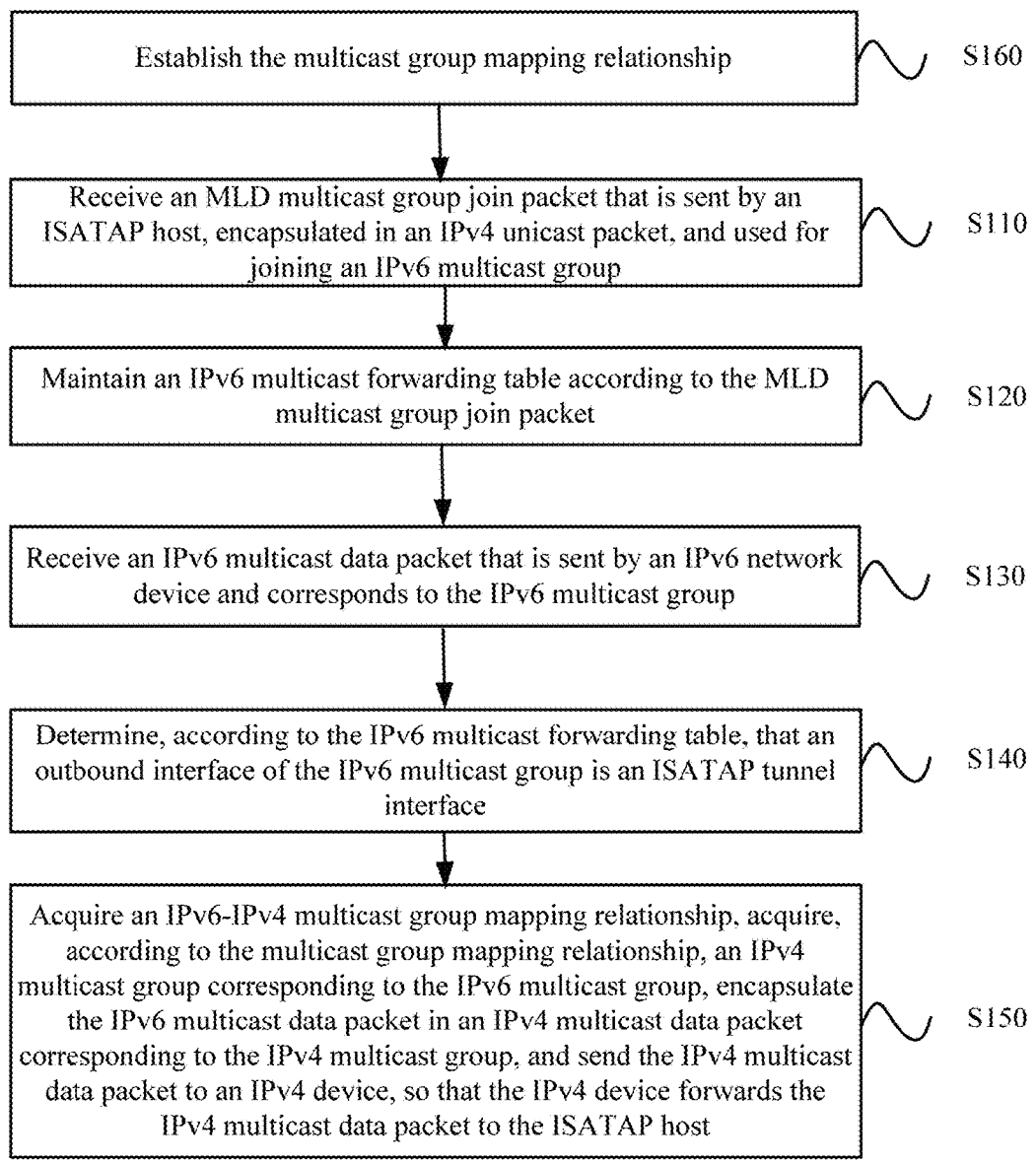
FIG. 2 is another schematic flowchart of the multicast packet forwarding method according to the embodiment of the present invention.

In this embodiment of the present invention, as shown in FIG. 2, optionally, before the acquiring an IPv6-IPv4 multicast group mapping relationship, the method 100 further includes:

S160: Establish the multicast group mapping relationship.

Specifically, in order to implement multicast forwarding of the IPv6 multicast data packet on the IPv4 network, the IPv6-IPv4 multicast group mapping relationship may be established on the ISATAP device and the ISATAP host. In this way, on one hand, when requesting to join the IPv6 multicast group, the ISATAP host may generate, according to the multicast group mapping relationship, the IGMP multicast group join packet used for joining the IPv4 multicast group corresponding to the IPv6 multicast group, and send the IGMP multicast group join packet to the IPv4 device; on the other hand, when needing to send the IPv6 multicast data packet to the IPv4 network, the ISATAP device can encapsulate, according to the multicast group mapping relationship, the IPv6 multicast data packet in the IPv4 multicast data packet, and send the IPv4 multicast data packet to the IPv4 device, and then the IPv4 device forwards the IPv4 multicast data packet to the ISATAP host.

There may be various manners of establishing the IPv6-IPv4 multicast group mapping relationship, and this embodiment of the present invention sets no limit thereon. For example, a manner of preassigning may be used, where a one-to-one correspondence between multicast groups of the ISATAP device and the ISATAP host is assigned, for example, FF03::1<--->235.0.0.1; a manner of automatic mapping may also be used, where an IPv4 multicast group segment for mapping is configured or is assigned by default on the ISATAP device and the ISATAP host, and all low-order bits of an IPv6 multicast group address are mapped to low-order bits of an IPv4 multicast group network segment, for example, an IPv4 multicast group network segment 235.0.0.0/16 corresponds to FFxx:xxxx:xxxx:xxxx:xxxx: xxxx:xxxx: 0000/112 of an IPv6 multicast group.

It should be understood that, there may be another manner of acquiring the IPv6-IPv4 multicast group mapping relationship by the ISATAP device. For example, if the ISATAP device does not establish the multicast group mapping relationship, the ISATAP device may acquire the multicast group mapping relationship from another server.

Figure 3:
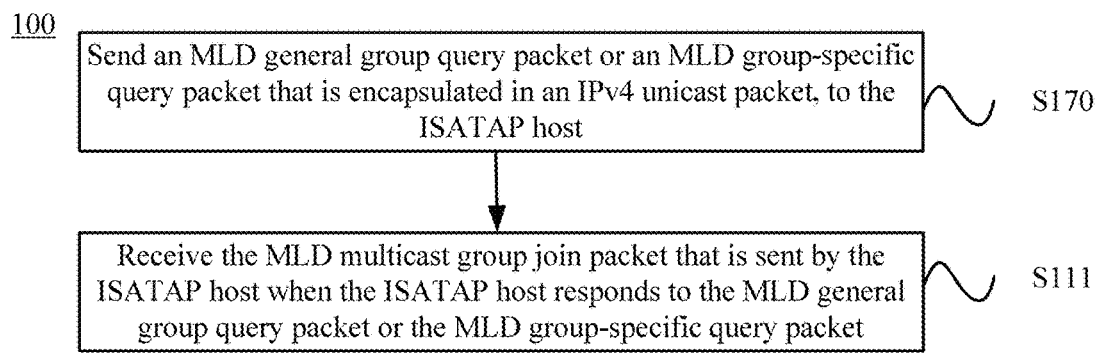
FIG. 3 is still another schematic flowchart of the multicast packet forwarding method according to the embodiment of the present invention.

In this embodiment of the present invention, as shown in FIG. 3, optionally, the method 100 further includes:

S170: Send an MLD general group query packet or an MLD group-specific query packet that is encapsulated in an IPv4 unicast packet, to the ISATAP host.

S110 includes:

S111: Receive the MLD multicast group join packet that is sent by the ISATAP host when the ISATAP host responds to the MLD general group query packet or the MLD group-specific query packet.

Specifically, the ISATAP device needs to regularly maintain an MLD multicast group (namely, the IPv6 multicast group) membership. The ISATAP device first encapsulates an IPv6 multicast packet header in the MLD general group query packet or the MLD group-specific query packet, copies the MLD general group query packet or the MLD group-specific query packet according to an IPv6 neighbor entry of the ISATAP tunnel, then encapsulates an IPv4 unicast packet header separately, and sends an encapsulated packet to the IPv4 device. Then, the encapsulated packet is forwarded by the IPv4 device to the ISATAP host. The ISATAP host performs decapsulation after receiving the IPv4 unicast packet, to obtain the MLD general group query packet or the MLD group-specific query packet, and then sends the MLD general group query packet or the MLD group-specific query packet to the MLD protocol layer for processing; when the MLD protocol layer needs to respond to the MLD general group query packet or the MLD group-specific query packet, the ISATAP host sends the MLD multicast group join packet to the ISATAP device, indicating that the ISATAP host continues to join the IPv6 multicast group.

If the ISATAP host does not respond to the MLD general group query packet or the MLD group-specific query packet of the ISATAP device, it indicates that the ISATAP host no longer joins the IPv6 multicast group. The ISATAP host may also proactively send an MLD multicast group leave packet used for leaving the IPv6 multicast group to the ISATAP device. Therefore, optionally, the method 100 further includes: receiving the MLD multicast group leave packet that is sent by the ISATAP host, encapsulated in an IPv4 unicast packet, and used for leaving the IPv6 multicast group; and decapsulating the MLD multicast group leave packet, and maintaining the IPv6 multicast forwarding table according to the MLD multicast group leave packet.

When requesting to leave the IPv6 multicast group, the ISATAP host encapsulates the MLD multicast group leave packet in the IPv4 unicast packet, and sends the IPv4 unicast packet to the ISATAP device. The unicast packet is forwarded by the device on the IPv4 network to the ISATAP device. After receiving the MLD multicast group leave packet encapsulated in the IPv4 unicast packet, the ISATAP device decapsulates the IPv4 unicast packet to obtain the MLD multicast group leave packet, maintains the IPv6 multicast group member information table according to the MLD multicast group leave packet, sends an IPv6 PIM message upstream, and maintains the IPv6 multicast forwarding table.

It should be understood that, in this embodiment of the present invention, the maintaining the IPv6 multicast forwarding table includes adding or deleting an entry of the ISATAP host. For example, when receiving the MLD multicast group join packet sent by the ISATAP host, the ISATAP device adds an entry of the ISATAP host according to the MLD multicast group join packet; when receiving the MLD multicast group leave packet sent by the ISATAP host, the ISATAP device sends an MLD group-specific query packet according to the MLD multicast group leave packet, and deletes the entry of the ISATAP host if the ISATAP device does not receive the MLD multicast group join packet that the ISATAP host responds to the MLD group-specific query packet with.

According to the multicast packet forwarding method in this embodiment of the present invention, an IPv6 multicast data packet is encapsulated, according to an IPv6-IPv4 multicast group mapping relationship, in an IPv4 multicast data packet and sent to an IPv4 network, without a need to copy IPv6 multicast data and transmit multiple copies on the IPv4 network, thereby saving bandwidth of the IPv4 network.

The foregoing describes in detail the multicast packet forwarding method from the perspective of an ISATAP device with reference to FIG. 1 to FIG. 3, and the following describes in detail a multicast packet forwarding method from the perspective of an ISATAP host with reference to FIG. 4 to FIG. 7.

Figure 4:
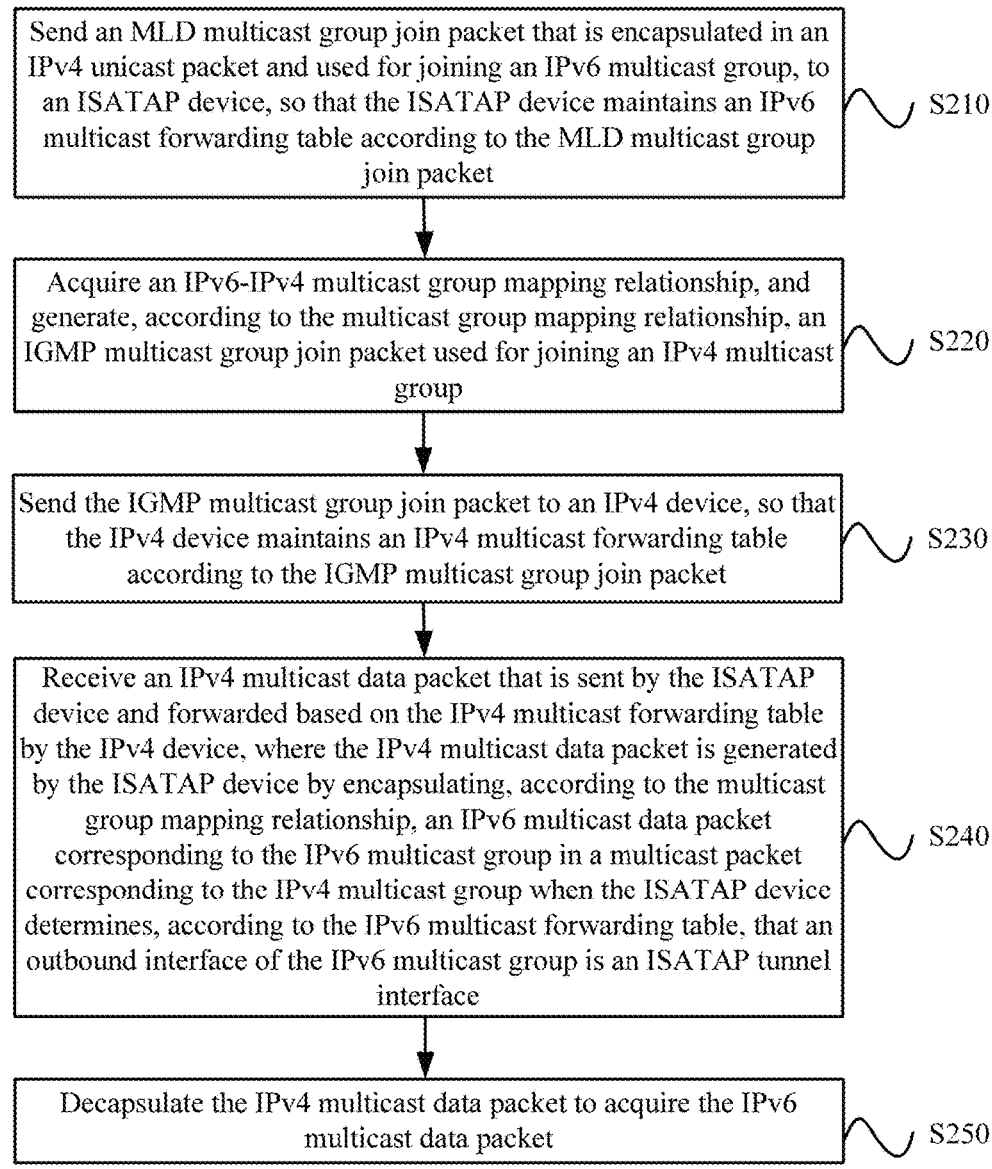
FIG. 4 is a schematic flowchart of a multicast packet forwarding method according to another embodiment of the present invention.

FIG. 4 shows a schematic flowchart of a multicast packet forwarding method 200 according to another embodiment of the present invention. The method 200 is executed by an ISATAP host. As shown in FIG. 4, the method 200 includes:

S210: Send an MLD multicast group join packet that is encapsulated in an IPv4 unicast packet and used for joining an IPv6 multicast group, to an ISATAP device, so that the ISATAP device maintains an IPv6 multicast forwarding table according to the MLD multicast group join packet.

S220: Acquire an IPv6-IPv4 multicast group mapping relationship, and generate, according to the multicast group mapping relationship, an IGMP multicast group join packet used for joining an IPv4 multicast group.

S230: Send the IGMP multicast group join packet to an IPv4 device, so that the IPv4 device maintains an IPv4 multicast forwarding table according to the IGMP multicast group join packet.

S240: Receive an IPv4 multicast data packet that is sent by the ISATAP device and forwarded based on the IPv4 multicast forwarding table by the IPv4 device, where the IPv4 multicast data packet is generated by the ISATAP device by encapsulating, according to the multicast group mapping relationship, an IPv6 multicast data packet corresponding to the IPv6 multicast group in a multicast packet corresponding to the IPv4 multicast group when the ISATAP device determines, according to the IPv6 multicast forwarding table, that an outbound interface of the IPv6 multicast group is an ISATAP tunnel interface.

S250: Decapsulate the IPv4 multicast data packet to acquire the IPv6 multicast data packet.

When requesting to join the IPv6 multicast group, the ISATAP host sends the MLD multicast group join packet to the ISATAP device, where the MLD multicast group join packet is encapsulated in the IPv4 unicast packet, and the IPv4 unicast packet is forwarded by a device on an IPv4 network to the ISATAP device. The ISATAP device maintains the IPv6 multicast forwarding table according to the MLD multicast group join packet. In addition, the ISATAP host acquires the IPv6-IPv4 multicast group mapping relationship, and generates, according to the multicast group mapping relationship, the IGMP multicast group join packet used for joining the IPv4 multicast group, and sends the IGMP multicast group join packet to an IPv4 device on a broadcast network where the ISATAP host is located. The IPv4 device maintains the IPv4 multicast forwarding table according to the IGMP multicast group join packet. When receiving the IPv6 multicast data packet that is sent by an IPv6 network device and corresponds to the IPv6 multicast group, the ISATAP device determines, according to the IPv6 multicast forwarding table, that the outbound interface of the IPv6 multicast group is the ISATAP tunnel interface, acquires the IPv6-IPv4 multicast group mapping relationship, encapsulates, according to the multicast group mapping relationship, the IPv6 multicast data packet in the IPv4 multicast data packet corresponding to the IPv4 multicast group, and sends the IPv4 multicast data packet to the IPv4 device. The IPv4 device forwards, based on the IPv4 multicast forwarding table, the IPv4 multicast data packet to the ISATAP host. After receiving the IPv4 multicast data packet, the ISATAP host decapsulates the IPv4 multicast data packet, so as to acquire the IPv6 multicast data packet.

In this way, according to the multicast packet forwarding method in this embodiment of the present invention, an MLD multicast group join packet used for joining an IPv6 multicast group is sent to an ISATAP device, and an IGMP multicast group join packet used for joining an IPv4 multicast group corresponding to the IPv6 multicast group is sent to an IPv4 device; therefore, multicast forwarding of an IPv6 multicast data packet on an IPv4 network may be implemented without a need to copy IPv6 multicast data and transmit multiple copies on the IPv4 network, thereby saving bandwidth of the IPv4 network.

The ISATAP host acquires a global unicast IPv6 address and an IPv6 local link address from the ISATAP device, where the global unicast IPv6 address is obtained by combining an ISATAP prefix with 5EFE:IPv4-Address, and the IPv6 local link address is FE80::5EFE:IPv4-Address. The ISATAP host uses this global unicast IPv6 address to access a device and a host on an IPv6 network.

When requesting the IPv6 multicast data packet, the ISATAP host sends the MLD multicast group join packet, where the MLD multicast group join packet is encapsulated in the IPv4 unicast packet, and the IPv4 unicast packet is forwarded by the IPv4 device to the ISATAP device. A destination IPv4 address of the IPv4 unicast packet is a destination address of the ISATAP device, which is configured on the ISATAP host. In addition, the ISATAP host constructs the IGMP multicast group join packet according to the IPv6-IPv4 multicast group mapping relationship, and sends the IGMP multicast group join packet to the IPv4 device. The IPv4 device sends an IPv4 PIM message to an upstream device, and maintains the IPv4 multicast forwarding table, for example, adding an entry of the ISATAP host to the IPv4 multicast forwarding table. After receiving the MLD multicast group join packet encapsulated in the IPv4 unicast packet, the ISATAP device executes decapsulation, sends the MLD multicast group join packet upstream to an MLD protocol layer for processing, generates an IPv6 multicast group member information table, sends an IPv6 PIM message upstream, and maintains the IPv6 multicast forwarding table.

Figure 5:
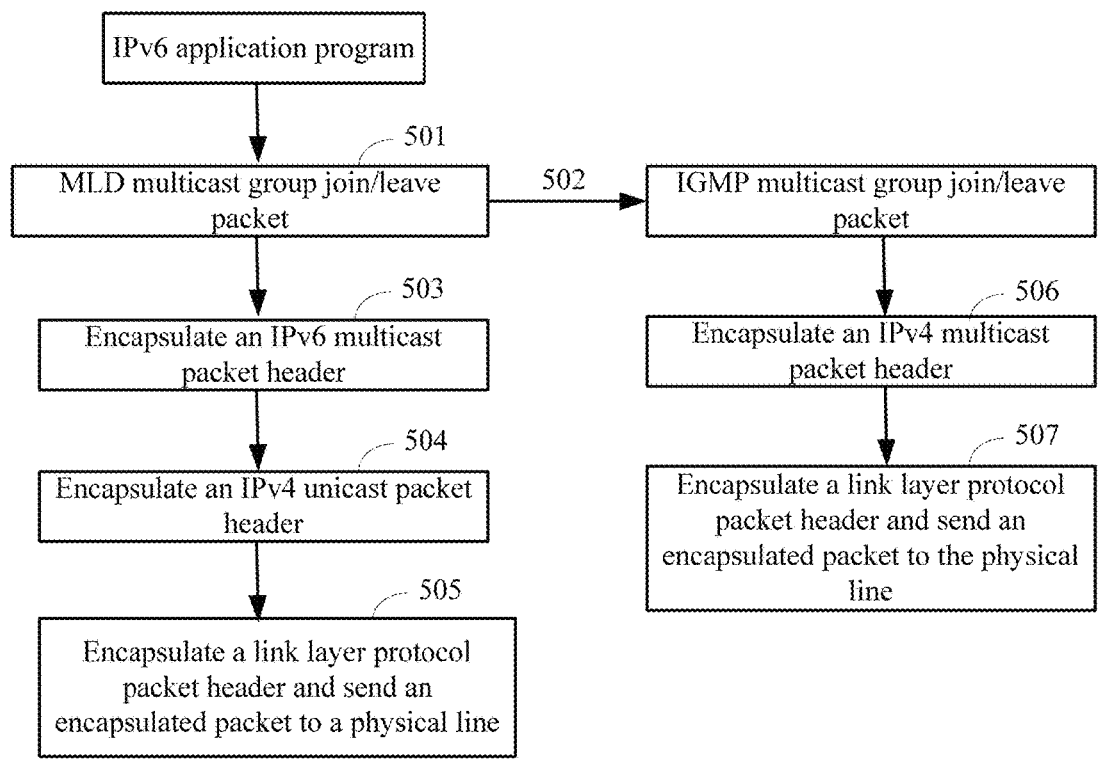
FIG. 5 is a flowchart for sending an MLD multicast group join packet and an IGMP multicast group join packet according to the another embodiment of the present invention.

A process in which the ISATAP host sends the MLD multicast group join packet and the IGMP multicast group join packet is shown in FIG. 5.

501: When the ISATAP host needs to join the IPv6 multicast group, an "IPv6 application program" on the ISATAP host sends the MLD multicast group join packet.

502: The ISATAP host generates the IGMP multicast group join packet according to the IPv6-IPv4 multicast group mapping relationship, that is, converts the MLD multicast group join packet into the IGMP multicast group join packet.

503: Encapsulate an IPv6 multicast packet header in the MLD multicast group join packet.

504: Further encapsulate an IPv4 unicast packet header in the MLD multicast group join packet that is encapsulated with the IPv6 multicast packet header, where a destination address in the IPv4 unicast packet header is a destination address, which is configured on the ISATAP host, to an ISATAP tunnel.

505: After step 504, further encapsulate a link layer protocol packet header in the MLD multicast group join packet, and send the encapsulated MLD multicast group join packet to a physical line.

506: Encapsulate an IPv4 multicast packet header in the IGMP multicast group join packet.

507: After step 506, further encapsulate a link layer protocol packet header in the IGMP multicast group join packet, and send the encapsulated IGMP multicast group join packet to a physical line.

Figure 6:
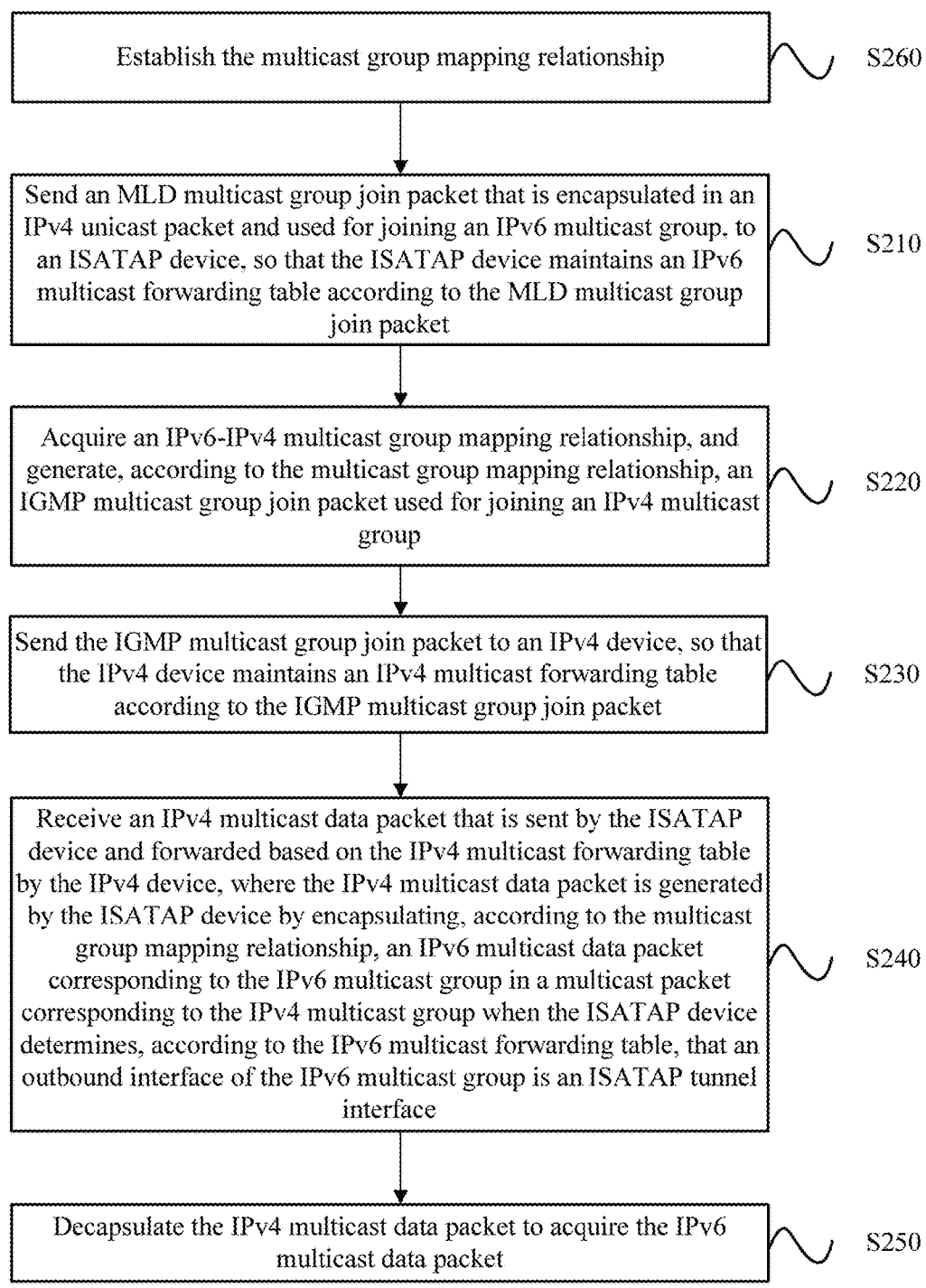
FIG. 6 is another schematic flowchart of the multicast packet forwarding method according to the another embodiment of the present invention.
Figure 7:
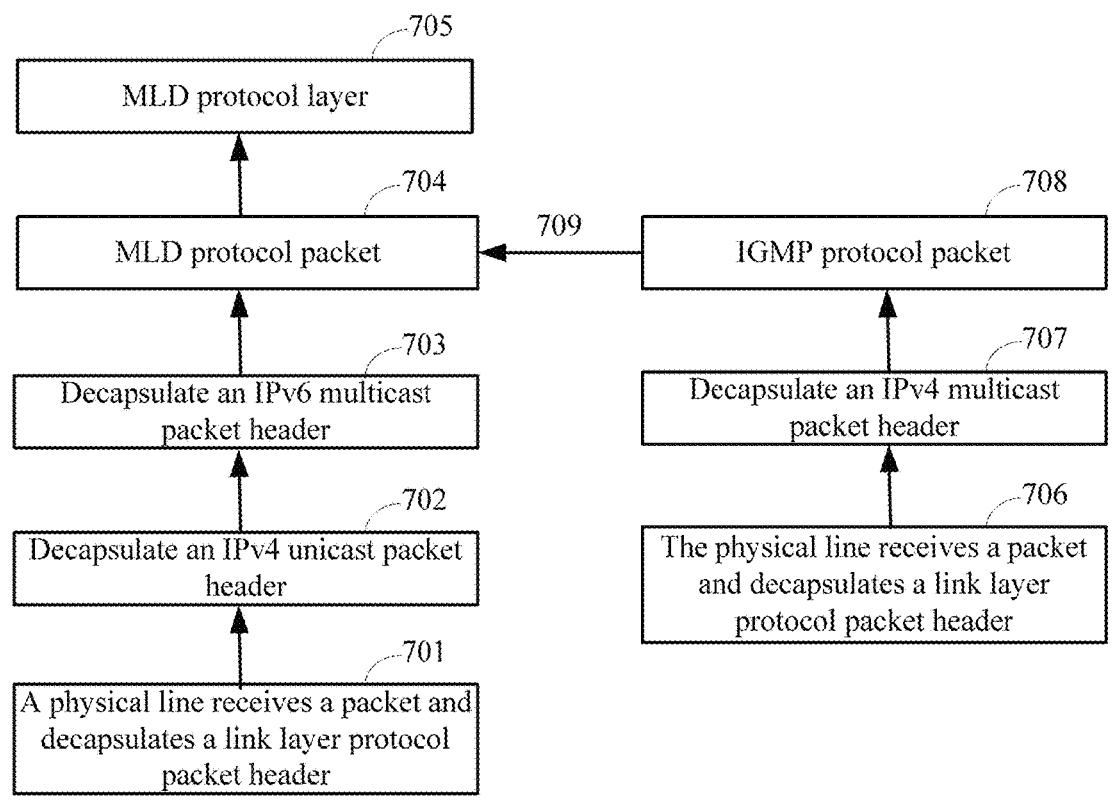
FIG. 7 is a flowchart for receiving an MLD protocol packet and an IGMP protocol packet according to the another embodiment of the present invention.

In this embodiment of the present invention, as shown in FIG. 6, optionally, before the acquiring an IPv6-IPv4 multicast group mapping relationship, the method 200 further includes:

S260: Establish the multicast group mapping relationship.

The IPv6-IPv4 multicast group mapping relationship is established on the ISATAP device and the ISATAP host. In this way, when requesting to join the IPv6 multicast group, the ISATAP host may generate, according to the multicast group mapping relationship, the IGMP multicast group join packet used for joining the IPv4 multicast group corresponding to the IPv6 multicast group, and send the IGMP multicast group join packet to the IPv4 device.

The ISATAP device needs to regularly maintain an MLD multicast group membership. Therefore, in this embodiment of the present invention, optionally, the method 200 further includes: receiving an MLD general group query packet or an MLD group-specific query packet that is sent by the ISATAP device and encapsulated in an IPv4 unicast packet; determining, according to the IPv6 multicast group that is joined, to respond to the MLD general group query packet or the MLD group-specific query packet; and sending the MLD multicast group join packet to the ISATAP device when responding to the MLD general group query packet or the MLD group-specific query packet, so that the ISATAP device maintains the IPv6 multicast forwarding table according to the MLD multicast group join packet.

Specifically, the ISATAP device first encapsulates an IPv6 multicast packet header in the MLD general group query packet or the MLD group-specific query packet, copies the MLD general group query packet or the MLD group-specific query packet according to an IPv6 neighbor entry of the ISATAP tunnel, then encapsulates an IPv4 unicast packet header separately, and sends an encapsulated packet to the IPv4 device. Then, the encapsulated packet is forwarded by the IPv4 device to the ISATAP host. The ISATAP host performs decapsulation after receiving the IPv4 unicast packet, to obtain the MLD general group query packet or the MLD group-specific query packet, and then sends the MLD general group query packet or the MLD group-specific query packet to the MLD protocol layer for processing. A specific process is shown in steps 701 to 705 in FIG. 7.

701: The ISATAP host receives a packet from a physical line and decapsulates a link layer protocol packet header from the packet, where the packet contains the MLD general group query packet or the MLD group-specific query packet.

702: Decapsulate the IPv4 unicast packet header from the packet to get an IPv6 multicast packet.

703: Further decapsulate the IPv6 multicast packet.

704: After the decapsulation, obtain an MLD protocol packet, namely, the MLD general group query packet or the MLD group-specific query packet.

705: Send the MLD general group query packet or the MLD group-specific query packet to the MLD protocol layer for processing.

The MLD protocol layer determines, according to the IPv6 multicast group that is joined, to respond to the MLD general group query packet or the MLD group-specific query packet. The MLD multicast group join packet is sent to the ISATAP device when the MLD general group query packet or the MLD group-specific query packet is responded to, indicating that the ISATAP host continues to join the IPv6 multicast group. A process in which the ISATAP host sends the MLD multicast group join packet to the ISATAP device is shown in FIG. 5, and details are not described herein again.

The IPv4 device also needs to maintain an IGMP multicast group membership, and the IPv4 device sends an IGMP general group query packet or an IGMP group-specific query packet to the ISATAP host. When the ISATAP host receives the IGMP general group query packet or the IGMP group-specific query packet, there are two processing manners. Therefore, on one hand, optionally, the method 200 further includes: receiving the IGMP general group query packet or the IGMP group-specific query packet sent by the IPv4 device; determining, according to the IPv6 multicast group that is joined and the multicast group mapping relationship, to respond to the IGMP general group query packet or the IGMP group-specific query packet; and sending the IGMP multicast group join packet to the IPv4 device when responding to the IGMP general group query packet or the IGMP group-specific query packet, so that the IPv4 device maintains the IPv4 multicast forwarding table according to the IGMP multicast group join packet.

In this manner, when receiving the IGMP general group query packet or the IGMP group-specific query packet sent by the IPv4 device, the ISATAP host determines, according to the IPv6-IPv4 multicast group mapping relationship and the IPv6 multicast group joined by the ISATAP host, whether to respond to the IGMP general group query packet or the IGMP group-specific query packet. When the IPv6 multicast group joined by the ISATAP host is in an IPv6-IPv4 multicast group mapping relationship list, the ISATAP host responds to the IGMP general group query packet or the IGMP group-specific query packet. An IGMP protocol stack constructs the IGMP multicast group join packet and sends the IGMP multicast group join packet to the IPv4 device, so that the IPv4 device maintains the IGMP multicast group membership and the IPv4 multicast forwarding table.

On the other hand, optionally, the method 200 further includes: receiving the IGMP general group query packet or the IGMP group-specific query packet sent by the IPv4 device; determining, according to the IPv6 multicast group that is joined and the multicast group mapping relationship, to convert the IGMP general group query packet or the IGMP group-specific query packet into an MLD general group query packet or an MLD group-specific query packet; determining, according to the IPv6 multicast group that is joined, to respond to the MLD general group query packet or the MLD group-specific query packet; and sending the IGMP multicast group join packet to the IPv4 device when responding to the MLD general group query packet or the MLD group-specific query packet, so that the IPv4 device maintains the IPv4 multicast forwarding table according to the IGMP multicast group join packet.

In this manner, when receiving the IGMP general group query packet or the IGMP group-specific query packet sent by the IPv4 device, the ISATAP host determines, according to the IPv6-IPv4 multicast group mapping relationship and the IPv6 multicast group joined by the ISATAP host, whether to convert the IGMP general group query packet or group-specific query packet into the MLD general group query packet or group-specific query packet; when the IPv6 multicast group joined by the ISATAP host is in an IPv6-IPv4 multicast group mapping relationship list, the ISATAP host converts the IGMP general group query packet or the IGMP group-specific query packet into the MLD general group query packet or the MLD group-specific query packet, and sends the MLD general group query packet or the MLD group-specific query packet to the MLD protocol layer for processing. A specific process is shown in steps 706 to 709 in FIG. 7.

706: The ISATAP host receives a packet from a physical line and decapsulates a link layer protocol packet header from the packet, where the packet contains the IGMP general group query packet or the IGMP group-specific query packet.

707: Decapsulate an IPv4 unicast packet header.

708: After the decapsulation, obtain an IGMP protocol packet, namely, the IGMP general group query packet or the IGMP group-specific query packet.

709: Determine, according to the IPv6-IPv4 multicast group mapping relationship and the IPv6 multicast group joined by the ISATAP host, to convert the IGMP general group query packet or the IGMP group-specific query packet into the MLD general group query packet or the MLD group-specific query packet, and send the MLD general group query packet or the MLD group-specific query packet to the MLD protocol layer for processing.

The MLD protocol layer responds to the MLD general group query packet or the MLD group-specific query packet according to the IPv6 multicast group joined by the ISATAP host; a subsequent process is shown in FIG. 5, and details are not described herein again.

The ISATAP host may also proactively send an MLD multicast group leave packet used for leaving the IPv6 multicast group to the ISATAP device. Therefore, optionally, the method 200 further includes: sending an MLD multicast group leave packet that is encapsulated in an IPv4 unicast packet and used for leaving the IPv6 multicast group, to the ISATAP device, so that the ISATAP device maintains the IPv6 multicast forwarding table according to the MLD multicast group leave packet.

The ISATAP host may also proactively send an IGMP multicast group leave packet used for leaving the IPv4 multicast group to the IPv4 device. Therefore, optionally, the method 200 further includes: generating, according to the multicast group mapping relationship, the IGMP multicast group leave packet used for leaving the IPv4 multicast group; and sending the IGMP multicast group leave packet to the IPv4 device, so that the IPv4 device maintains the IPv4 multicast forwarding table according to the IGMP multicast group leave packet.

A specific process in which the ISATAP host sends the MLD multicast group leave packet to the ISATAP device and sends the IGMP multicast group leave packet to the IPv4 device is shown in FIG. 5, and is similar to the process in which the ISATAP host sends the MLD multicast group join packet and the IGMP multicast group join packet, and details are not described herein again.

According to the multicast packet forwarding method in this embodiment of the present invention, an MLD multicast group join packet used for joining an IPv6 multicast group is sent to an ISATAP device, and an IGMP multicast group join packet used for joining an IPv4 multicast group corresponding to the IPv6 multicast group is sent to an IPv4 device; therefore, multicast forwarding of an IPv6 multicast data packet on an IPv4 network may be implemented, thereby saving bandwidth of the IPv4 network.

Figure 8:
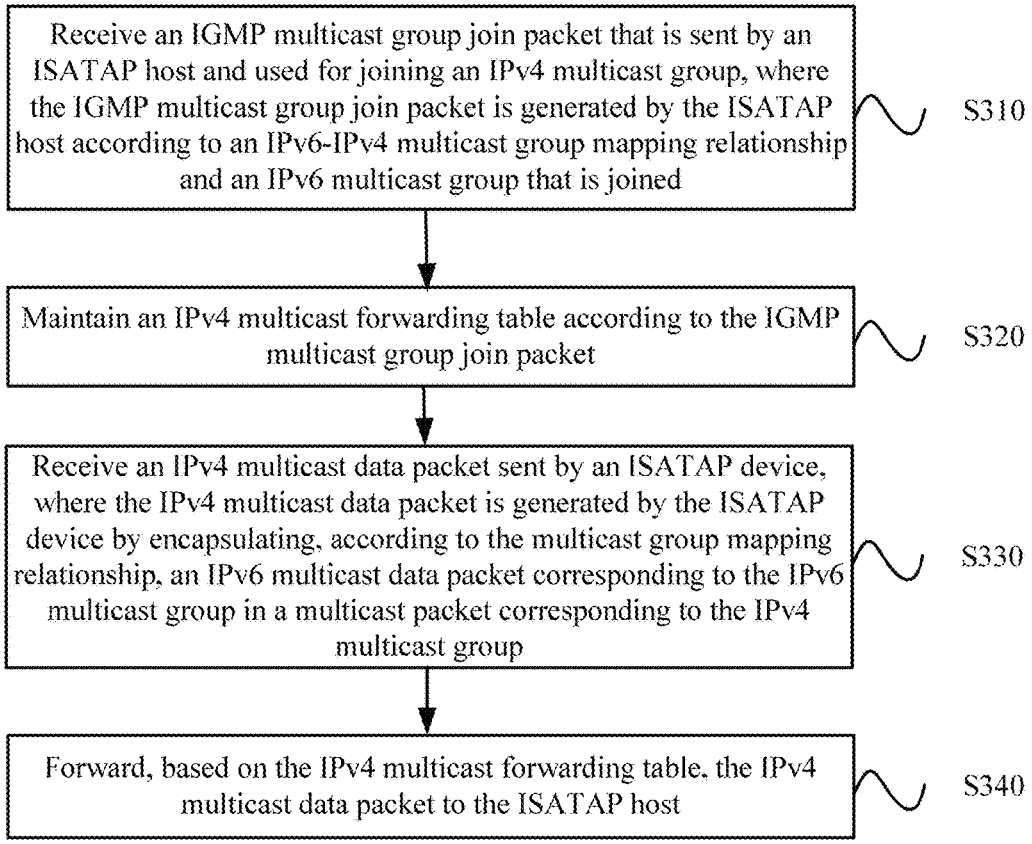
FIG. 8 is a schematic flowchart of a multicast packet forwarding method according to still another embodiment of the present invention.
Figure 9:
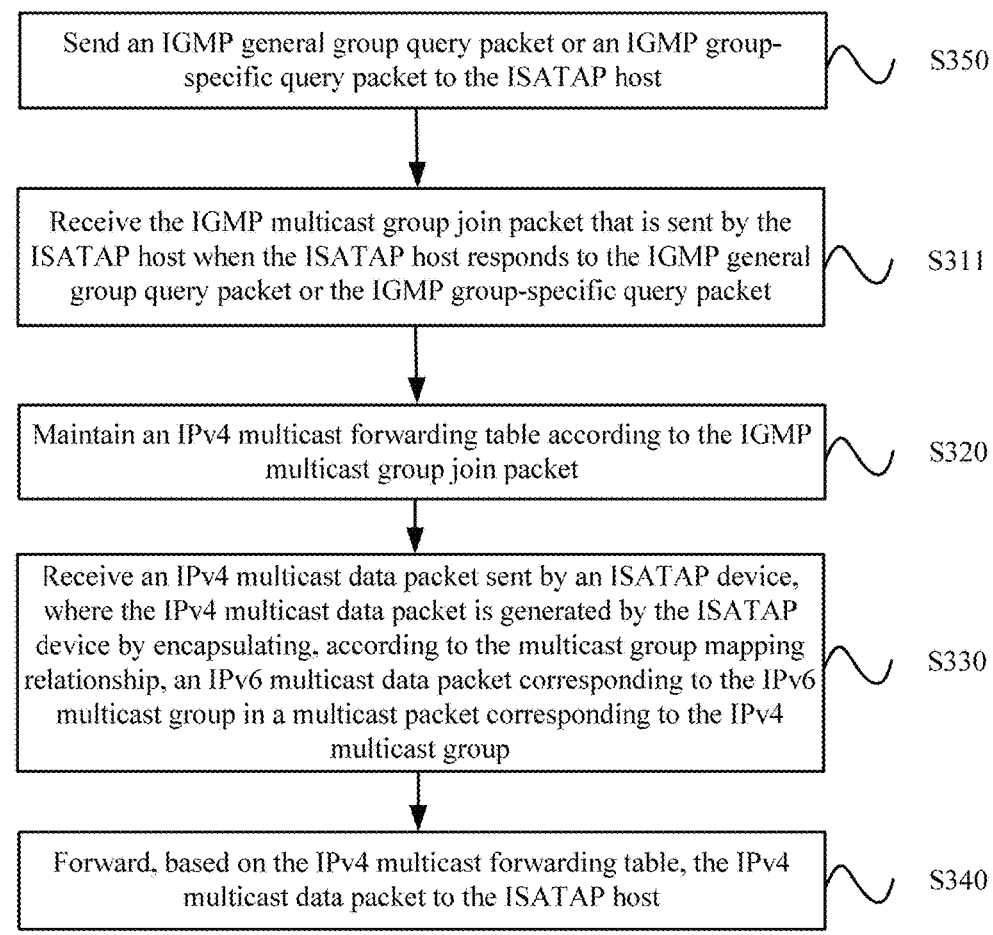
FIG. 9 is another schematic flowchart of the multicast packet forwarding method according to the still another embodiment of the present invention.

The foregoing describes in detail the multicast packet forwarding method from the perspective of an ISATAP device with reference to FIG. 1 to FIG. 3, and describes in detail the multicast packet forwarding method from the perspective of an ISATAP host with reference to FIG. 4 to FIG. 7, and the following describes in detail a multicast packet forwarding method from the perspective of an IPv4 device with reference to FIG. 8 and FIG. 9.

FIG. 8 shows a schematic flowchart of a multicast packet forwarding method 300 according to still another embodiment of the present invention. The method 300 is executed by an IPv4 device. As shown in FIG. 8, the method 300 includes:

S310: Receive an IGMP multicast group join packet that is sent by an ISATAP host and used for joining an IPv4 multicast group, where the IGMP multicast group join packet is generated by the ISATAP host according to an IPv6-IPv4 multicast group mapping relationship and an IPv6 multicast group that is joined.

S320: Maintain an IPv4 multicast forwarding table according to the IGMP multicast group join packet.

S330: Receive an IPv4 multicast data packet sent by an ISATAP device, where the IPv4 multicast data packet is generated by the ISATAP device by encapsulating, according to the multicast group mapping relationship, an IPv6 multicast data packet corresponding to the IPv6 multicast group in a multicast packet corresponding to the IPv4 multicast group.

S340: Forward, based on the IPv4 multicast forwarding table, the IPv4 multicast data packet to the ISATAP host.

When requesting the IPv6 multicast data packet, the ISATAP host sends an MLD multicast group join packet to the ISATAP device; in addition, the ISATAP host generates, according to the IPv6-IPv4 multicast group mapping relationship, the IGMP multicast group join packet used for joining the IPv4 multicast group, and sends the IGMP multicast group join packet to the IPv4 device. After receiving the IGMP multicast group join packet sent by the ISATAP host, the IPv4 device maintains the IPv4 multicast forwarding table according to the IGMP multicast group join packet. When an IPv6 network device sends the IPv6 multicast data packet to the ISATAP device, the ISATAP device encapsulates, according to the IPv6-IPv4 multicast group mapping relationship, the IPv6 multicast data packet in the IPv4 multicast data packet corresponding to the IPv4 multicast group, and sends the IPv4 multicast data packet to the IPv4 device. The IPv4 device forwards, based on the IPv4 multicast forwarding table, the IPv4 multicast data packet to the ISATAP host.

In this way, according to the multicast packet forwarding method in this embodiment of the present invention, an IPv4 multicast forwarding table is maintained according to an IGMP multicast group join packet that is sent by an ISATAP host and used for joining an IPv4 multicast group corresponding to an IPv6 multicast group, and an IPv4 multicast data packet encapsulated with an IPv6 multicast data packet is forwarded based on the IPv4 multicast forwarding table to the ISATAP host; therefore, multicast forwarding of the IPv6 multicast data packet on an IPv4 network may be implemented, thereby saving bandwidth of the IPv4 network.

In this embodiment of the present invention, as shown in FIG. 9, optionally, the method 300 further includes:

S350: Send an IGMP general group query packet or an IGMP group-specific query packet to the ISATAP host.

S310 includes:

S311: Receive the IGMP multicast group join packet that is sent by the ISATAP host when the ISATAP host responds to the IGMP general group query packet or the IGMP group-specific query packet.

Specifically, the IPv4 device needs to maintain an IGMP multicast group membership. The IPv4 device sends the IGMP general group query packet or the IGMP group-specific query packet to the ISATAP host. After the ISATAP host receives the IGMP general group query packet or the IGMP group-specific query packet, the ISATAP host sends the IGMP multicast group join packet to the IPv4 device when needing to respond to the IGMP general group query packet or the IGMP group-specific query packet.

The ISATAP host may also proactively send an IGMP multicast group leave packet used for leaving the IPv4 multicast group to the IPv4 device. Therefore, optionally, the method 300 further includes: receiving the IGMP multicast group leave packet that is sent by the ISATAP host and used for leaving the IPv4 multicast group; and maintaining the IPv4 multicast forwarding table according to the IGMP multicast group leave packet.

After receiving the IGMP multicast group leave packet sent by the ISATAP host, the IPv4 device maintains an IGMP multicast group member information entry according to the IGMP multicast group leave packet, sends an IPv4 PIM packet upstream, and maintains the IPv4 multicast forwarding table.

It should be understood that, in this embodiment of the present invention, the maintaining the IPv4 multicast forwarding table includes adding or deleting an entry of the ISATAP host. For example, when receiving the IGMP multicast group join packet sent by the ISATAP host, the IPv4 device adds an entry of the ISATAP host according to the IGMP multicast group join packet; when receiving the IGMP multicast group leave packet sent by the ISATAP host, the IPv4 device sends the IGMP group-specific query packet according to the IGMP multicast group leave packet, and deletes the entry of the ISATAP host if the IPv4 device does not receive the IGMP multicast group join packet that the ISATAP host responds to the IGMP group-specific query packet with.

The following describes in detail the embodiments of the present invention with reference to specific examples. It should be noted that, these examples are merely intended for helping a person skilled in the art better understand the embodiments of the present invention, rather than limiting the scope of the embodiments of the present invention.

Figure 10:
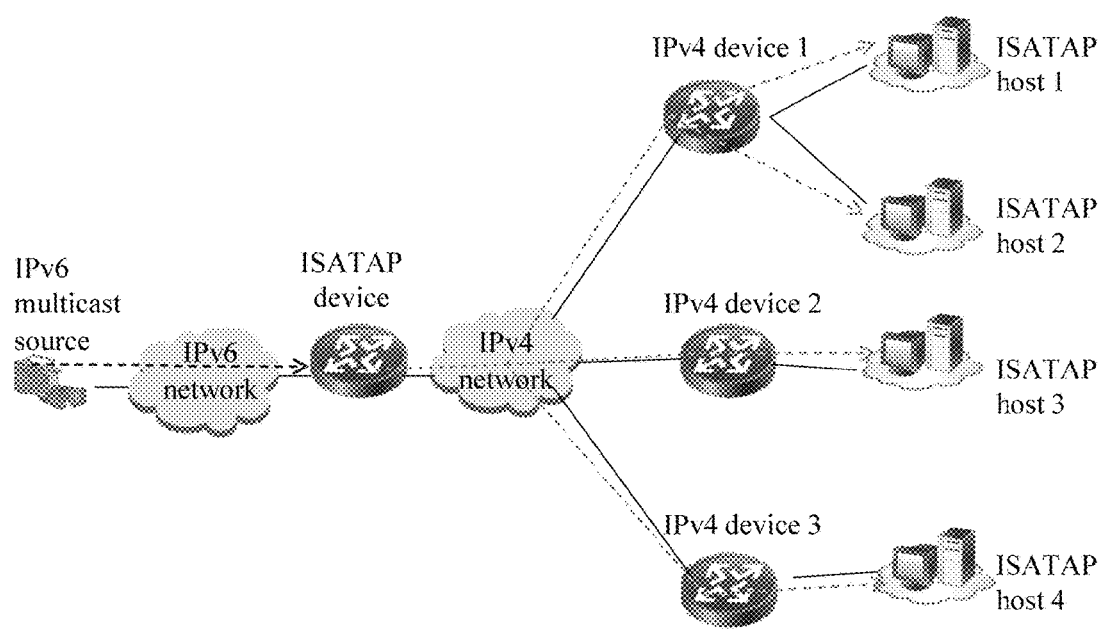
FIG. 10 is a schematic diagram of forwarding an IPv6 multicast packet on an IPv4 network according to an embodiment of the present invention.
Figure 11:
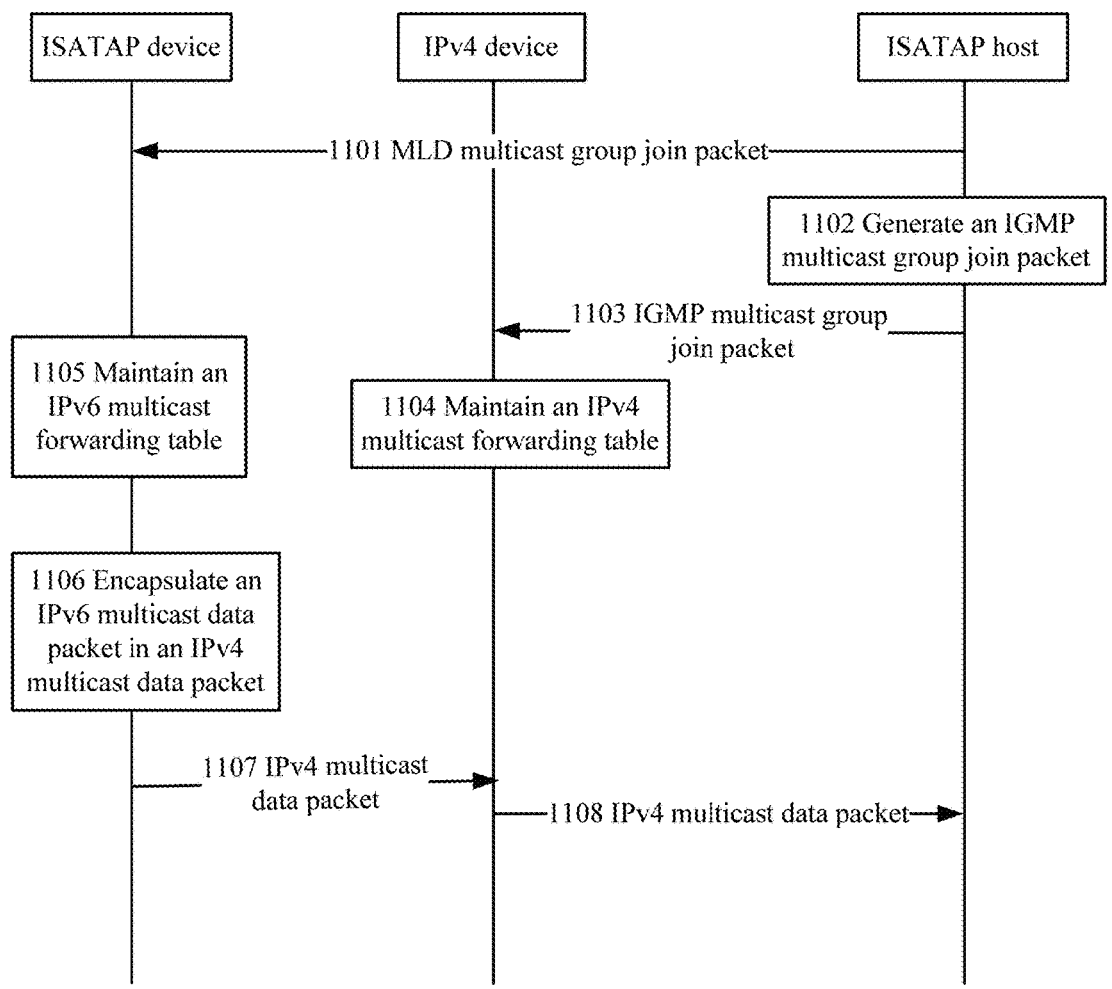
FIG. 11 is a schematic diagram of a multicast packet forwarding method according to an embodiment of the present invention.

FIG. 10 is a schematic diagram of forwarding of an IPv6 multicast packet on an IPv4 network according to an embodiment of the present invention. Both an ISATAP device and ISATAP hosts support IPv4 and IPv6 protocol stacks. The ISATAP device is physically connected to an IPv6 network on one side, and connected to an IPv4 network on another side; the ISATAP hosts are physically connected only to the IPv4 network. An ISATAP host 1 and an ISATAP host 2 may be in a same network segment or in different network segments. An IPv4 device 1, an IPv4 device 2, and an IPv4 device 3 all support processing of an IGMP protocol packet. A device on the IPv4 network supports an IPv4 PIM function; a device on the IPv6 network supports an IPv6 PIM function. A specific process is shown in FIG. 11.

1101: An ISATAP host sends an MLD multicast join packet used for joining an IPv6 multicast group to the ISATAP device. The MLD multicast group join packet is encapsulated in an IPv4 unicast packet, where a destination address of the IPv4 unicast packet is a destination address, which is configured on the ISATAP host, to an ISATAP tunnel, and the IPv4 unicast packet is forwarded by an IPv4 device to the ISATAP device.

1102: The ISATAP host generates an IGMP multicast group join packet used for joining an IPv4 multicast group. The ISATAP host acquires an IPv6-IPv4 multicast group mapping relationship, and generates, according to the multicast group mapping relationship, the IGMP multicast group join packet used for joining the IPv4 multicast group corresponding to the IPv6 multicast group.

1103: The ISATAP host sends the IGMP multicast group join packet to the IPv4 device.

1104: The IPv4 device maintains an IPv4 multicast forwarding table. After receiving the IGMP multicast group join packet, the IPv4 device sends an IPv4 PIM message upstream, and maintains the IPv4 multicast forwarding table.

1105: The ISATAP device maintains an IPv6 multicast forwarding table. After receiving the MLD multicast group join packet encapsulated in the IPv4 unicast packet, the ISATAP device decapsulates the packet, sends the MLD multicast group join packet upstream to an MLD protocol layer for processing, generates an IPv6 multicast group member information table, sends an IPv6 PIM message upstream, and maintains the IPv6 multicast forwarding table.

1106: The ISATAP device encapsulates an IPv6 multicast data packet in an IPv4 multicast data packet. When receiving the IPv6 multicast data packet sent from an IPv6 network device, the ISATAP device determines, according to the IPv6 multicast forwarding table, that an outbound interface of the IPv6 multicast group is an ISATAP tunnel interface, acquires the IPv6-IPv4 multicast group mapping relationship, and encapsulates the IPv6 multicast data packet in the IPv4 multicast data packet according to the multicast group mapping relationship, where a source IPv4 address of the IPv4 multicast data packet is a source IPv4 address of the ISATAP tunnel interface.

1107: The ISATAP device sends the IPv4 multicast data packet to the IPv4 device.

1108: The IPv4 device forwards, based on the IPv4 multicast forwarding table, the IPv4 multicast data packet to the ISATAP host.

After receiving the IPv4 multicast data packet, the ISATAP host decapsulates the IPv4 multicast data packet, and sends the obtained IPv6 multicast data packet to an upper protocol layer of the ISATAP host for processing.

Therefore, according to the multicast packet forwarding method in this embodiment of the present invention, an IPv6 multicast data packet is encapsulated, according to an IPv6-IPv4 multicast group mapping relationship, in an IPv4 multicast data packet corresponding to an IPv4 multicast group, and the IPv4 multicast data packet is then sent to an IPv4 network; therefore, multicast forwarding of the IPv6 multicast data packet on the IPv4 network may be implemented without a need to copy IPv6 multicast data and transmit multiple copies on the IPv4 network, thereby saving bandwidth of the IPv4 network.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

The foregoing describes in detail the multicast packet forwarding methods according to the embodiments of the present invention with reference to FIG. 1 to FIG. 11, and the following describes in detail an ISATAP device, an ISATAP host, and an IPv4 device according to embodiments of the present invention with reference to FIG. 12 to FIG. 19.

Figure 12:
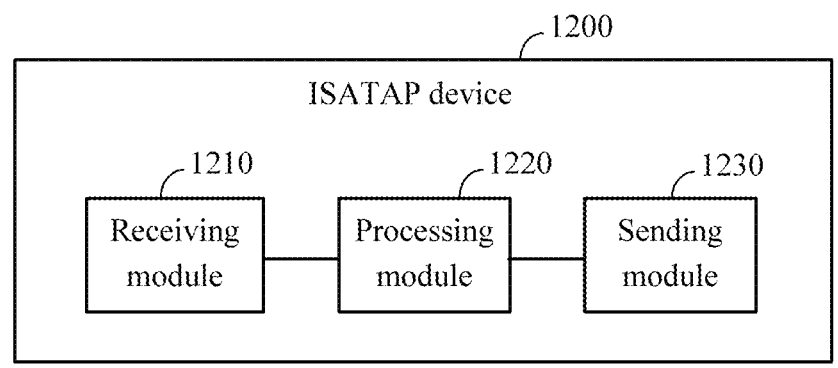
FIG. 12 is a schematic block diagram of an ISATAP device according to an embodiment of the present invention.

FIG. 12 shows a schematic block diagram of an ISATAP device 1200 according to an embodiment of the present invention. As shown in FIG. 12, the ISATAP device 1200 includes: a receiving module 1210 configured to receive a MLD multicast group join packet that is sent by an ISATAP host, encapsulated in an IPv4 unicast packet, and used for joining an IPv6 multicast group; a processing module 1220 configured to maintain an IPv6 multicast forwarding table according to the MLD multicast group join packet, where: the receiving module 1210 is further configured to receive an IPv6 multicast data packet that is sent by an IPv6 network device and corresponds to the IPv6 multicast group; and the processing module 1220 is further configured to determine, according to the IPv6 multicast forwarding table, that an outbound interface of the IPv6 multicast group is an ISATAP tunnel interface, acquire an IPv6-IPv4 multicast group mapping relationship, acquire, according to the multicast group mapping relationship, an IPv4 multicast group corresponding to the IPv6 multicast group, and encapsulate the IPv6 multicast data packet in an IPv4 multicast data packet corresponding to the IPv4 multicast group; and a sending module 1230 configured to send the IPv4 multicast data packet to an IPv4 device, so that the IPv4 device forwards the IPv4 multicast data packet to the ISATAP host.

The ISATAP device in this embodiment of the present invention encapsulates, according to an IPv6-IPv4 multicast group mapping relationship, an IPv6 multicast data packet in an IPv4 multicast data packet corresponding to an IPv4 multicast group, and then sends the IPv4 multicast data packet to an IPv4 network; therefore, multicast forwarding of the IPv6 multicast data packet on the IPv4 network may be implemented without a need to copy IPv6 multicast data and transmit multiple copies on the IPv4 network, thereby saving bandwidth of the IPv4 network.

Figure 13:
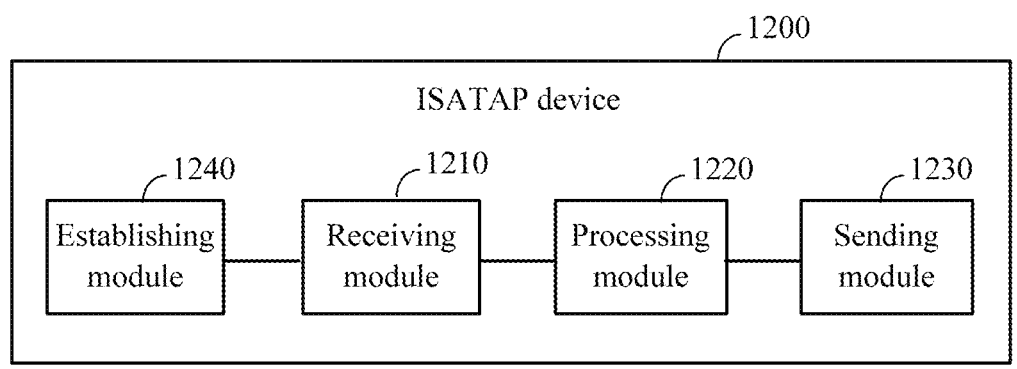
FIG. 13 is another schematic block diagram of the ISATAP device according to the embodiment of the present invention.

In this embodiment of the present invention, as shown in FIG. 13, optionally, the ISATAP device 1200 further includes an establishing module 1240 configured to: before the processing module 1220 acquires the IPv6-IPv4 multicast group mapping relationship, establish the multicast group mapping relationship.

Optionally, the sending module 1230 is further configured to send an MLD general group query packet or an MLD group-specific query packet that is encapsulated in an IPv4 unicast packet, to the ISATAP host; and the receiving module 1210 is further configured to receive the MLD multicast group join packet that is sent by the ISATAP host when the ISATAP host responds to the MLD general group query packet or the MLD group-specific query packet.

Optionally, the receiving module 1210 is further configured to receive an MLD multicast group leave packet that is sent by the ISATAP host, encapsulated in an IPv4 unicast packet, and used for leaving the IPv6 multicast group; and the processing module 1220 is further configured to maintain the IPv6 multicast forwarding table according to the MLD multicast group leave packet.

The ISATAP device 1200 according to this embodiment of the present invention may correspond to the ISATAP device in the multicast packet forwarding method according to the embodiments of the present invention, and the foregoing and other operations and/or functions of each module in the ISATAP device 1200 are separately used for implementing corresponding processes of the methods in FIG. 1 to FIG. 11. For brevity, details are not described herein again.

Figure 14:
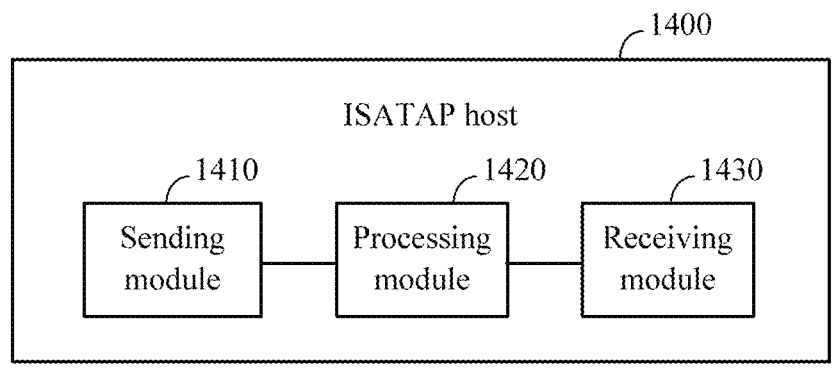
FIG. 14 is a schematic block diagram of an ISATAP host according to an embodiment of the present invention.

FIG. 14 shows a schematic block diagram of an ISATAP host 1400 according to an embodiment of the present invention. As shown in FIG. 14, the ISATAP host 1400 includes: a sending module 1410 configured to send a MLD multicast group join packet that is encapsulated in an IPv4 unicast packet and used for joining an IPv6 multicast group, to an ISATAP device, so that the ISATAP device maintains an IPv6 multicast forwarding table according to the MLD multicast group join packet; a processing module 1420 configured to acquire an IPv6-IPv4 multicast group mapping relationship, and generate, according to the multicast group mapping relationship, an IGMP multicast group join packet used for joining an IPv4 multicast group, where: the sending module 1410 is further configured to send the IGMP multicast group join packet to an IPv4 device, so that the IPv4 device maintains an IPv4 multicast forwarding table according to the IGMP multicast group join packet; and a receiving module 1430 configured to receive an IPv4 multicast data packet that is sent by the ISATAP device and forwarded based on the IPv4 multicast forwarding table by the IPv4 device, where the IPv4 multicast data packet is generated by the ISATAP device by encapsulating, according to the multicast group mapping relationship, an IPv6 multicast data packet corresponding to the IPv6 multicast group in a multicast packet corresponding to the IPv4 multicast group when the ISATAP device determines, according to the IPv6 multicast forwarding table, that an outbound interface of the IPv6 multicast group is an ISATAP tunnel interface, where: the processing module 1420 is further configured to decapsulate the IPv4 multicast data packet to acquire the IPv6 multicast data packet.

The ISATAP host in this embodiment of the present invention sends an MLD multicast group join packet used for joining an IPv6 multicast group to an ISATAP device, and sends an IGMP multicast group join packet used for joining an IPv4 multicast group corresponding to the IPv6 multicast group to an IPv4 device; therefore, multicast forwarding of an IPv6 multicast data packet on an IPv4 network may be implemented without a need to copy IPv6 multicast data and transmit multiple copies on the IPv4 network, thereby saving bandwidth of the IPv4 network.

Figure 15:
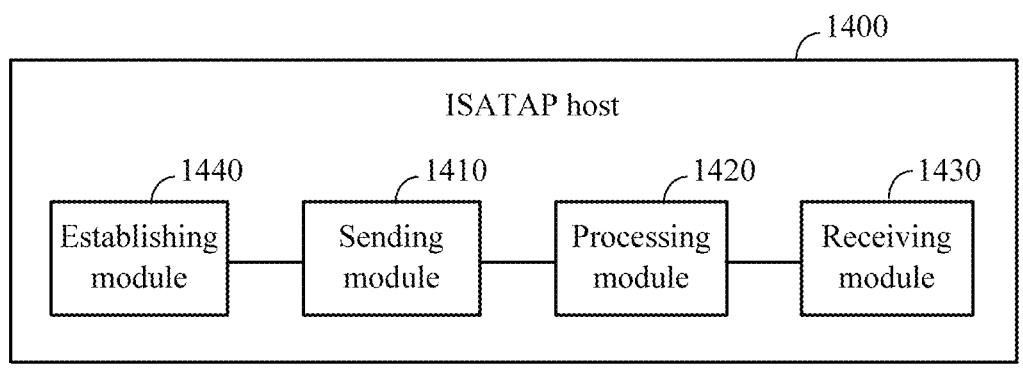
FIG. 15 is another schematic block diagram of the ISATAP host according to the embodiment of the present invention.

In this embodiment of the present invention, as shown in FIG. 15, optionally, the ISATAP host 1400 further includes an establishing module 1440 configured to: before the processing module 1420 acquires the IPv6-IPv4 multicast group mapping relationship, establish the multicast group mapping relationship.

Optionally, the receiving module 1430 is further configured to receive an MLD general group query packet or an MLD group-specific query packet that is sent by the ISATAP device and encapsulated in an IPv4 unicast packet; the processing module 1420 is further configured to determine, according to the IPv6 multicast group that is joined, to respond to the MLD general group query packet or the MLD group-specific query packet; and the sending module 1410 is further configured to send the MLD multicast group join packet to the ISATAP device when responding to the MLD general group query packet or the MLD group-specific query packet, so that the ISATAP device maintains the IPv6 multicast forwarding table according to the MLD multicast group join packet.

Optionally, the receiving module 1430 is further configured to receive an IGMP general group query packet or an IGMP group-specific query packet sent by the IPv4 device; the processing module 1420 is further configured to determine, according to the IPv6 multicast group that is joined and the multicast group mapping relationship, to respond to the IGMP general group query packet or the IGMP group-specific query packet; and the sending module 1410 is further configured to send the IGMP multicast group join packet to the IPv4 device when responding to the IGMP general group query packet or the IGMP group-specific query packet, so that the IPv4 device maintains the IPv4 multicast forwarding table according to the IGMP multicast group join packet.

Optionally, the receiving module 1430 is further configured to receive an IGMP general group query packet or an IGMP group-specific query packet sent by the IPv4 device; the processing module 1420 is further configured to determine, according to the IPv6 multicast group that is joined and the multicast group mapping relationship, to convert the IGMP general group query packet or the IGMP group-specific query packet into an MLD general group query packet or an MLD group-specific query packet, and determine, according to the IPv6 multicast group that is joined, to respond to the MLD general group query packet or the MLD group-specific query packet; and the sending module 1410 is further configured to send the IGMP multicast group join packet to the IPv4 device when responding to the MLD general group query packet or the MLD group-specific query packet, so that the IPv4 device maintains the IPv4 multicast forwarding table according to the IGMP multicast group join packet.

Optionally, the sending module 1410 is further configured to send an MLD multicast group leave packet that is encapsulated in an IPv4 unicast packet and used for leaving the IPv6 multicast group, to the ISATAP device, so that the ISATAP device maintains the IPv6 multicast forwarding table according to the MLD multicast group leave packet.

Optionally, the processing module 1420 is further configured to generate, according to the multicast group mapping relationship, an IGMP multicast group leave packet used for leaving the IPv4 multicast group; and the sending module 1410 is further configured to send the IGMP multicast group leave packet to the IPv4 device, so that the IPv4 device maintains the IPv4 multicast forwarding table according to the IGMP multicast group leave packet.

The ISATAP host 1400 according to this embodiment of the present invention may correspond to the ISATAP host in the multicast packet forwarding method according to the embodiments of the present invention, and the foregoing and other operations and/or functions of each module in the ISATAP host 1400 are separately used for implementing corresponding processes of the methods in FIG. 1 to FIG. 11. For brevity, details are not described herein again.

Figure 16:
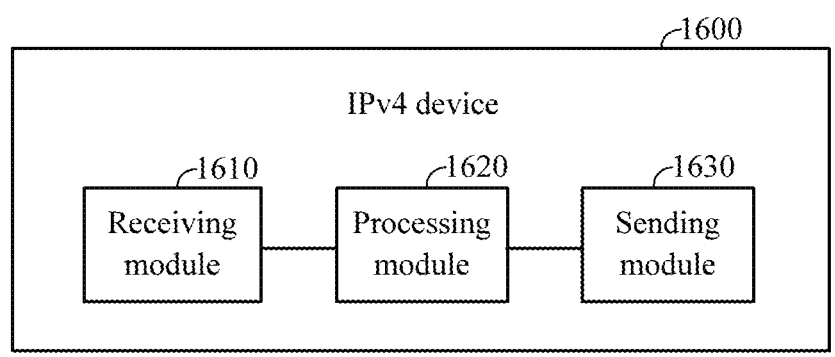
FIG. 16 is a schematic block diagram of an IPv4 device according to an embodiment of the present invention.

FIG. 16 shows a schematic block diagram of an IPv4 device 1600 according to an embodiment of the present invention. As shown in FIG. 16, the IPv4 device 1600 includes: a receiving module 1610 configured to receive an IGMP multicast group join packet that is sent by an ISATAP host and used for joining an IPv4 multicast group, where the IGMP multicast group join packet is generated by the ISATAP host according to an IPv6-IPv4 multicast group mapping relationship and an IPv6 multicast group that is joined; a processing module 1620 configured to maintain an IPv4 multicast forwarding table according to the IGMP multicast group join packet, where: the receiving module 1610 is further configured to receive an IPv4 multicast data packet sent by an ISATAP device, where the IPv4 multicast data packet is generated by the ISATAP device by encapsulating, according to the multicast group mapping relationship, an IPv6 multicast data packet corresponding to the IPv6 multicast group in a multicast packet corresponding to the IPv4 multicast group; and a sending module 1630 configured to forward, based on the IPv4 multicast forwarding table, the IPv4 multicast data packet to the ISATAP host.

The IPv4 device in this embodiment of the present invention maintains an IPv4 multicast forwarding table according to an IGMP multicast group join packet that is sent by an ISATAP host and used for joining an IPv4 multicast group corresponding to an IPv6 multicast group, and forwards, based on the IPv4 multicast forwarding table, an IPv4 multicast data packet encapsulated with an IPv6 multicast data packet to the ISATAP host; therefore, multicast forwarding of the IPv6 multicast data packet on an IPv4 network may be implemented, thereby saving bandwidth of the IPv4 network.

Optionally, the sending module 1630 is further configured to send an IGMP general group query packet or an IGMP group-specific query packet to the ISATAP host; and the receiving module 1610 is further configured to receive the IGMP multicast group join packet that is sent by the ISATAP host when the ISATAP host responds to the IGMP general group query packet or the IGMP group-specific query packet.

Optionally, the receiving module 1610 is further configured to receive an IGMP multicast group leave packet that is sent by the ISATAP host and used for leaving the IPv4 multicast group; and the processing module 1620 is further configured to maintain the IPv4 multicast forwarding table according to the IGMP multicast group leave packet.

The IPv4 device 1600 according to this embodiment of the present invention may correspond to the IPv4 device in the multicast packet forwarding method according to the embodiments of the present invention, and the foregoing and other operations and/or functions of each module in the IPv4 device 1600 are separately used for implementing corresponding processes of the methods in FIG. 1 to FIG. 11. For brevity, details are not described herein again.

Figure 17:
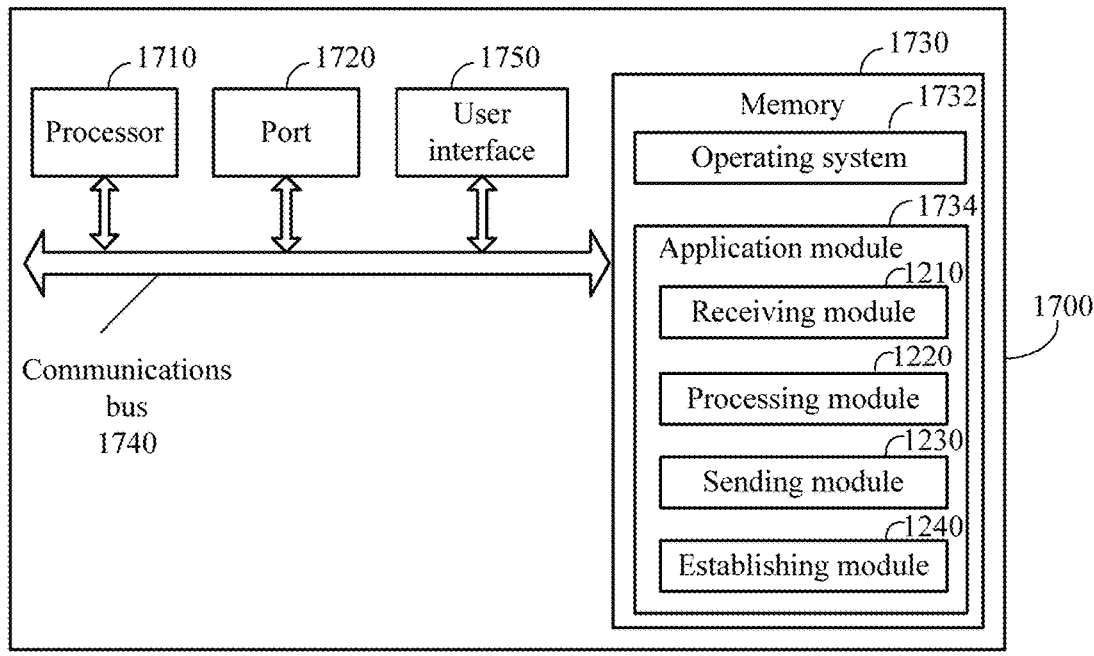
FIG. 17 is a schematic structural diagram of an ISATAP device according to an embodiment of the present invention.

FIG. 17 is a schematic structural diagram of an ISATAP device according to an embodiment of the present invention. As shown in FIG. 17, an ISATAP device 1700 generally includes at least one processor 1710 such as a central processing unit (CPU), at least one port 1720, a memory 1730, and at least one communications bus 1740. The communications bus 1740 is configured to implement connection and communication between these apparatuses. The processor 1710 is configured to execute an executable module, such as a computer program, stored in the memory 1730. Optionally, the ISATAP device includes a user interface 1750, which includes but is not limited to a display, a keyboard, and a click device such as a mouse, a trackball, a touch display pad, or a touch display screen. The memory 1730 may include a high-speed random access memory (RAM) memory, and may further include a non-volatile memory such as at least one magnetic disk memory. The at least one port 1720 is used to implement a communication connection between the ISATAP device and at least one network device.

In some implementation manners, the memory 1730 stores the following elements, executable modules or data structures, or a subset thereof, or an extended set thereof: an operating system 1732, which includes various system programs and is configured to implement various basic services and process hardware-based tasks; and an application module 1734, which includes various application programs and is configured to implement various application services.

The application module 1734 includes, but is not limited to, a receiving module 1210, a processing module 1220, a sending module 1230, and an establishing module 1240.

For specific implementation of the modules in the application module 1734, reference may be made to corresponding modules in the embodiment shown in FIG. 12 and FIG. 13, and details are not described herein again.

Figure 18:
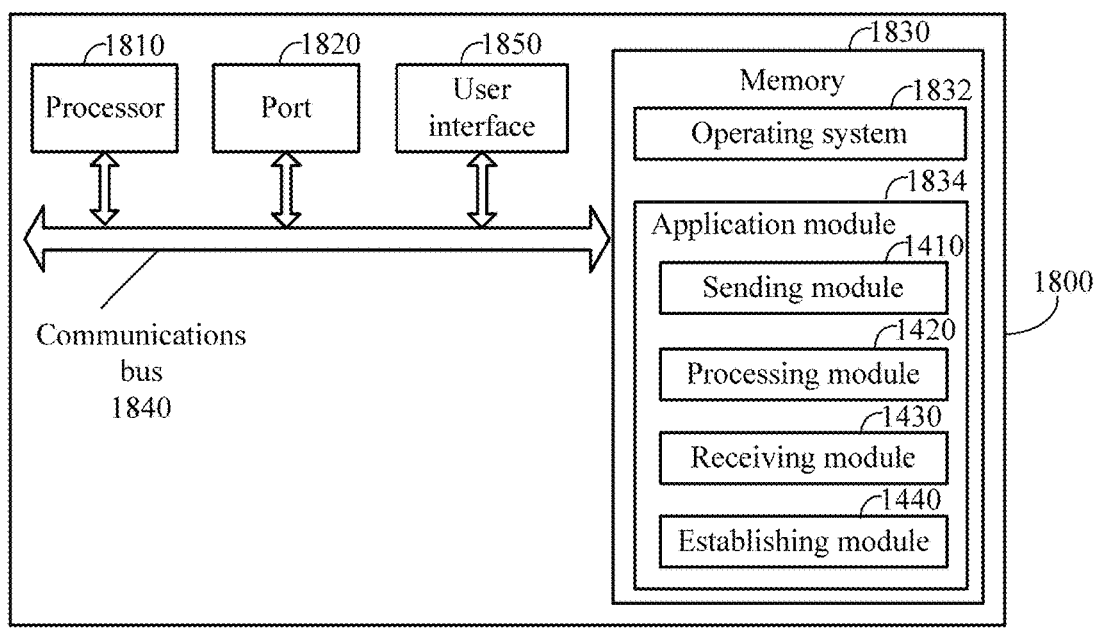
FIG. 18 is a schematic structural diagram of an ISATAP host according to an embodiment of the present invention.

FIG. 18 is a schematic structural diagram of an ISATAP host according to an embodiment of the present invention. As shown in FIG. 18, an ISATAP host 1800 generally includes at least one processor 1810 such as a CPU, at least one port 1820, a memory 1830, and at least one communications bus 1840. The communications bus 1840 is configured to implement connection and communication between these apparatuses. The processor 1810 is configured to execute an executable module, such as a computer program, stored in the memory 1830. Optionally, the ISATAP host includes a user interface 1850, which includes but is not limited to a display, a keyboard, and a click device such as a mouse, a trackball, a touch display pad, or a touch display screen. The memory 1830 may include a high-speed RAM memory, and may further include a non-volatile memory, such as at least one magnetic disk memory. The at least one port 1820 is used to implement a communication connection between the ISATAP host and at least one network device.

In some implementation manners, the memory 1830 stores the following elements, executable modules or data structures, or a subset thereof, or an extended set thereof: an operating system 1832, which includes various system programs and is configured to implement various basic services and process hardware-based tasks; and an application module 1834, which includes various application programs and is configured to implement various application services.

The application module 1834 includes, but is not limited to, a sending module 1410, a processing module 1420, a receiving module 1430, and an establishing module 1440.

For specific implementation of the modules in the application module 1834, reference may be made to corresponding modules in the embodiment shown in FIG. 14 and FIG. 15, and details are not described herein again.

Figure 19:
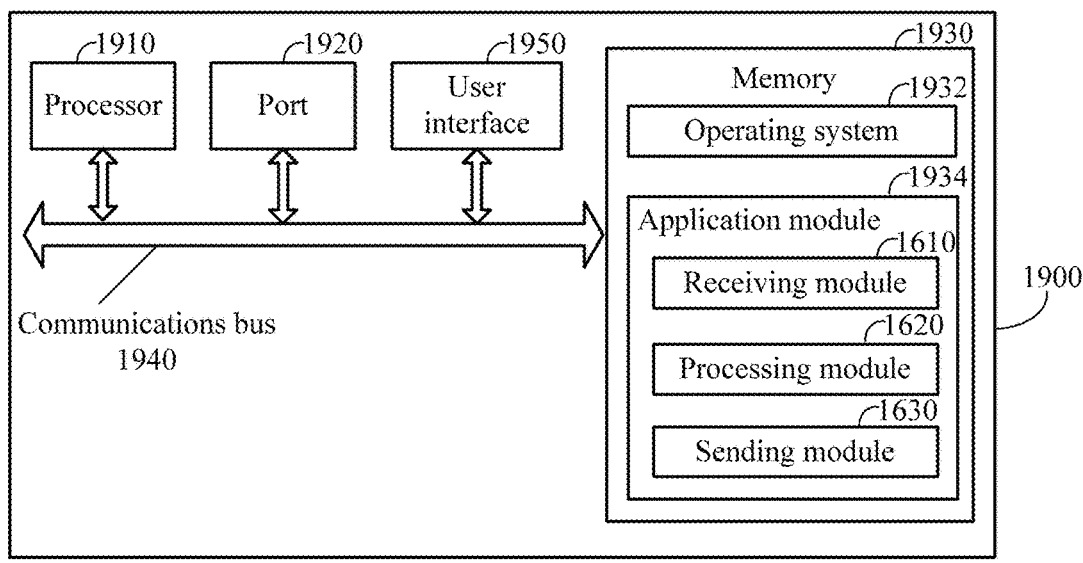
FIG. 19 is a schematic structural diagram of an IPv4 device according to an embodiment of the present invention.

FIG. 19 is a schematic structural diagram of an IPv4 device according to an embodiment of the present invention. As shown in FIG. 19, an IPv4 device 1900 generally includes at least one processor 1910 such as a CPU, at least one port 1920, a memory 1930, and at least one communications bus 1940. The communications bus 1940 is configured to implement connection and communication between these apparatuses. The processor 1910 is configured to execute an executable module, such as a computer program, stored in the memory 1930. Optionally, the IPv4 device includes a user interface 1950, which includes but is not limited to a display, a keyboard, and a click device such as a mouse, a trackball, a touch display pad, or a touch display screen. The memory 1930 may include a high-speed RAM memory, and may further include a non-volatile memory, such as at least one magnetic disk memory. The at least one port 1920 is used to implement a communication connection between the IPv4 device and at least one network device.

In some implementation manners, the memory 1930 stores the following elements, executable modules or data structures, or a subset thereof, or an extended set thereof: an operating system 1932, which includes various system programs and is configured to implement various basic services and process hardware-based tasks; and an application module 1934, which includes various application programs and is configured to implement various application services.

The application module 1934 includes, but is not limited to, a receiving module 1610, a processing module 1620, and a sending module 1630.

For specific implementation of the modules in the application module 1934, reference may be made to corresponding modules in the embodiment shown in FIG. 16, and details are not described herein again.

It should be understood that, the term "and/or" in this embodiment of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a Universal Serial Bus (USB) flash drive, a removable hard disk, a read-only memory (ROM), a RAM, a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A multicast packet forwarding method, implemented by an Intra-Site Automatic Tunnel Addressing Protocol (ISATAP) device, the method comprising:
   receiving a first Internet Protocol version 4 (IPv4) unicast packet from an ISATAP host, a Multicast Listener Discovery (MLD) multicast group join packet being encapsulated in the first IPv4 unicast packet, and the MLD multicast group join packet being used for joining an Internet Protocol version 6 (IPv6) multicast group;
   maintaining an IPv6 multicast forwarding table according to the MLD multicast group join packet, the IPv6 multicast forwarding table comprising an entry of the ISATAP host, wherein in the entry an outbound interface corresponding to the ISATAP host is identified as an ISATAP tunnel interface;
   receiving an IPv6 multicast data packet from an IPv6 network device and corresponds to the IPv6 multicast group;
   determining, according to the IPv6 multicast forwarding table, that an outbound interface of the IPv6 multicast group is the ISATAP tunnel interface;
   acquiring, based on the determination, an IPv6-IPv4 multicast group mapping relationship, the IPv6-IPv4 multicast group mapping relationship comprising an IPv6 multicast group address and an IPv4 multicast group address;
   acquiring, according to the IPv6-IPv4 multicast group mapping relationship, an IPv4 multicast group corresponding to the IPv6 multicast group;
   encapsulating the IPv6 multicast data packet in an IPv4 multicast data packet corresponding to the IPv4 multicast group; and
   sending the IPv4 multicast data packet to an IPv4 device so that the IPv4 device forwards the IPv4 multicast data packet to the ISATAP host according to an IPv4 multicast forwarding table, the IPv4 multicast forwarding table comprising an address of the ISATAP host.

2. The method according to claim 1, wherein before acquiring the IPv6-IPv4 multicast group mapping relationship, the method further comprises establishing the IPv6-IPv4 multicast group mapping relationship.

3. The method according to claim 1, further comprising sending a second IPv4 unicast packet to the ISATAP host, an MLD general group query packet or an MLD group-specific query packet being encapsulated in the IPv4 unicast packet, and receiving the first IPv4 unicast packet comprising receiving the first IPv4 unicast packet from the ISATAP host when the ISATAP host responds to the MLD general group query packet or the MLD group-specific query packet in the second IPv4 unicast packet.

4. The method according to claim 1, further comprising:
   receiving an MLD multicast group leave packet from the ISATAP host, the MLD multicast group leave packet being encapsulated in the IPv4 unicast packet, and the MLD multicast group leave packet being used for leaving the IPv6 multicast group; and
   maintaining the IPv6 multicast forwarding table according to the MLD multicast group leave packet.

5. A multicast packet forwarding method, implemented by an Intra-Site Automatic Tunnel Addressing Protocol (ISATAP) host, the method comprising:
   sending a first Internet Protocol version 4 (IPv4) unicast packet to an ISATAP device so that the ISATAP device maintains an Internet Protocol version 6 (IPv6) multicast forwarding table according to a Multicast Listener Discovery (MLD)-multicast group join packet, the IPv6 multicast forwarding table comprising an entry of the ISATAP host, wherein in the entry an outbound interface corresponding to the ISATAP host is identified as an ISATAP tunnel interface, the MLD multicast group join packet being encapsulated in the IPv4 unicast packet, and the MLD multicast group join packet being used for joining an IPv6 multicast group;
   acquiring an IPv6-IPv4 multicast group mapping relationship, the IPv6-IPv4 multicast group mapping relationship comprising an IPv6 multicast group address and an IPv4 multicast group address;
   generating, according to the IPv6-IPv4 multicast group mapping relationship, an Internet Group Management Protocol (IGMP) multicast group join packet used for joining an IPv4 multicast group;

sending the IGMP multicast group join packet to an IPv4 device so that the IPv4 device maintains an IPv4 multicast forwarding table according to the IGMP multicast group join packet;

receiving an IPv4 multicast data packet from the ISATAP device and forwarded based on the IPv4 multicast forwarding table by the IPv4 device, the IPv4 multicast forwarding table comprising an address of the ISATAP host, the IPv4 multicast data packet being generated by the ISATAP device by encapsulating, according to the IPv6-IPv4 multicast group mapping relationship, an IPv6 multicast data packet corresponding to the IPv6 multicast group in a multicast packet corresponding to the IPv4 multicast group when the ISATAP device determines, according to the IPv6 multicast forwarding table, that an outbound interface of the IPv6 multicast group is the ISATAP tunnel interface; and decapsulating the IPv4 multicast data packet to acquire the IPv6 multicast data packet.

6. The method according to claim 5, further comprising:
receiving an MLD general group query packet or an MLD group-specific query packet from the ISATAP device and encapsulated in a second IPv4 unicast packet;

determining, according to the IPv6 multicast group that is joined, to respond to the MLD general group query packet or the MLD group-specific query packet; and sending the first IPv4 unicast packet that comprises the MLD multicast group join packet to the ISATAP device when responding to the MLD general group query packet or the MLD group-specific query packet so that the ISATAP device maintains the IPv6 multicast forwarding table according to the MLD multicast group join packet.

7. The method according to claim 5, further comprising:
receiving an IGMP general group query packet or an IGMP group-specific query packet from the IPv4 device;

determining, according to the IPv6 multicast group that is joined and the IPv6-IPv4 multicast group mapping relationship, to respond to the IGMP general group query packet or the IGMP group-specific query packet; and sending the IGMP multicast group join packet to the IPv4 device when responding to the IGMP general group query packet or the IGMP group-specific query packet so that the IPv4 device maintains the IPv4 multicast forwarding table according to the IGMP multicast group join packet.

8. The method according to claim 5, further comprising:
receiving an IGMP general group query packet or an IGMP group-specific query packet from the IPv4 device;

determining, according to the IPv6 multicast group that is joined and the IPv6-IPv4 multicast group mapping relationship, to convert the IGMP general group query packet or the IGMP group-specific query packet into an MLD general group query packet or an MLD group-specific query packet;

determining, according to the IPv6 multicast group that is joined, to respond to the MLD general group query packet or the MLD group-specific query packet; and sending the IGMP multicast group join packet to the IPv4 device when responding to the MLD general group query packet or the MLD group-specific query packet so that the IPv4 device maintains the IPv4 multicast forwarding table according to the IGMP multicast group join packet.

9. The method according to claim 5, further comprising sending an MLD multicast group leave packet to the ISATAP device so that the ISATAP device maintains the IPv6 multicast forwarding table according to the MLD multicast group leave packet, the MLD multicast group leave packet being encapsulated in the IPv4 unicast packet, and the MLD multicast group leave packet being used for leaving the IPv6 multicast group.

10. The method according to claim 5, further comprising:
generating, according to the IPv6-IPv4 multicast group mapping relationship, an IGMP multicast group leave packet used for leaving the IPv4 multicast group; and sending the IGMP multicast group leave packet to the IPv4 device so that the IPv4 device maintains the IPv4 multicast forwarding table according to the IGMP multicast group leave packet.

11. An Intra-Site Automatic Tunnel Addressing Protocol (ISATAP) device, comprising:
a receiver configured to receive a first Internet Protocol version 4 (IPv4) unicast packet from an ISATAP host, a Multicast Listener Discovery (MLD) multicast group join packet being encapsulated in the first IPv4 unicast packet, and the MLD multicast group join packet being used for joining an Internet Protocol version 6 (IPv6) multicast group;

a processor coupled to the receiver and configured to:
maintain an IPv6 multicast forwarding table according to the MLD multicast group join packet, the IPv6 multicast forwarding table comprising an entry of the ISATAP host, wherein in the entry an outbound interface corresponding to the ISATAP host is identified as an ISATAP tunnel interface, the receiver being further configured to receive an IPv6 multicast data packet from an IPv6 network device and corresponds to the IPv6 multicast group;

determine, according to the IPv6 multicast forwarding table, that an outbound interface of the IPv6 multicast group is the ISATAP tunnel interface;

acquire, based on the determination, an IPv6-IPv4 multicast group mapping relationship, the IPv6-IPv4 multicast group mapping relationship comprising an IPv6 multicast group address and an IPv4 multicast group address;

acquire, according to the IPv6-IPv4 multicast group mapping relationship, an IPv4 multicast group corresponding to the IPv6 multicast group; and encapsulate the IPv6 multicast data packet in an IPv4 multicast data packet corresponding to the IPv4 multicast group; and a transmitter coupled to the processor and configured to send the IPv4 multicast data packet to an IPv4 device so that the IPv4 device forwards the IPv4 multicast data packet to the ISATAP host according to an IPv4 multicast forwarding table, the IPv4 multicast forwarding table comprising an address of the ISATAP host.

12. The ISATAP device according to claim 11, further comprising an establishing module configured to establish the IPv6-IPv4 multicast group mapping relationship before the processor acquires the IPv6-IPv4 multicast group mapping relationship.

13. The ISATAP device according to claim 11, wherein the transmitter is further configured to send to the ISATAP host an MLD general group query packet or an MLD group-specific query packet that is encapsulated in the IPv4 unicast packet, and the receiver being further configured to receive the MLD multicast group join packet from the ISATAP host when the ISATAP host responds to the MLD general group query packet or the MLD group-specific query packet.

14. The ISATAP device according to claim 11, wherein the receiver is further configured to receive an MLD multicast group leave packet from the ISATAP host, the MLD multicast group leave packet being encapsulated in the IPv4 unicast packet, the MLD multicast group leave packet being used for leaving the IPv6 multicast group, and the processor being further configured to maintain the IPv6 multicast forwarding table according to the MLD multicast group leave packet.

* * * * *